United States Patent
Solomon

(10) Patent No.: US 10,981,166 B2
(45) Date of Patent: Apr. 20, 2021

(54) MANUAL OR ELECTRONIC PIPETTE DRIVEN WELL PLATE FOR NANO-LITER DROPLET STORAGE AND METHODS OF USING SAME

(71) Applicant: Neofluidics LLC, Lubbock, TX (US)

(72) Inventor: Deepak Solomon, Fallbrook, CA (US)

(73) Assignee: NEOFLUIDICS LLC, Lubbock, TX (US)

( * ) Notice: Subject to any disclaimer, the term of this patent is extended or adjusted under 35 U.S.C. 154(b) by 279 days.

(21) Appl. No.: 15/180,961

(22) Filed: Jun. 13, 2016

(65) Prior Publication Data

US 2016/0361716 A1     Dec. 15, 2016

Related U.S. Application Data

(60) Provisional application No. 62/174,310, filed on Jun. 11, 2015.

(51) Int. Cl.
   *B01L 3/00*          (2006.01)
   *G01N 35/10*       (2006.01)
   *G01N 1/38*         (2006.01)

(52) U.S. Cl.
   CPC ..... *B01L 3/502738* (2013.01); *B01L 3/50273* (2013.01); *B01L 3/502746* (2013.01);
(Continued)

(58) Field of Classification Search
   CPC ..... B01L 2300/0838; B01L 2300/0864; B01L 2300/0883; B01L 2400/0406;
(Continued)

(56) References Cited

U.S. PATENT DOCUMENTS

| | | | |
|---|---|---|---|
| 6,293,012 B1 * | 9/2001 | Moles | B01L 3/502707 29/890.124 |
| 2002/0033193 A1 | 3/2002 | McNeely et al. | |

(Continued)

FOREIGN PATENT DOCUMENTS

WO     2016/118949 A1     7/2016

OTHER PUBLICATIONS

International Search Report and Written Opinion dated Sep. 1, 2016 for PCT Application No. PCT/US2016/037225 filed Jun. 13, 2016.
(Continued)

*Primary Examiner* — Lyle Alexander
*Assistant Examiner* — Bryan Kilpatrick
(74) *Attorney, Agent, or Firm* — Katten Muchin Rosenman LLP

(57) ABSTRACT

Described herein are pipette driven well plates for nano-liter droplet storage and methods of using same. Embodiments may include an inlet, an outlet, a bypass channel, and a fluidic trap containing a valve covered by a removable covering, in which the fluid enters the fluidic trap when the removable covering is removed. The fluid enters either the fluidic trap or the bypass channel, depending on which of the fluidic trap or bypass channel has the lower hydrodynamic resistance. Embodiments may be used by closing the valve, introducing a first fluid to fill the fluidic trap and partially fill a bypass channel, opening the valve, removing the first fluid surrounding the valve, and introducing a second fluid into the fluidic trap, in which the introducing results in a mixture of the first and second fluids.

19 Claims, 23 Drawing Sheets

(52) U.S. Cl.
CPC ............... *B01L 2200/0605* (2013.01); *B01L 2200/0673* (2013.01); *B01L 2300/087* (2013.01); *B01L 2300/0829* (2013.01); *B01L 2300/0883* (2013.01); *B01L 2400/0475* (2013.01); *B01L 2400/0622* (2013.01); *B01L 2400/0638* (2013.01); *B01L 2400/0688* (2013.01); *B01L 2400/086* (2013.01); *G01N 1/38* (2013.01); *G01N 35/10* (2013.01)

(58) Field of Classification Search
CPC . B01L 3/502715; B01L 2200/06; G01N 1/38; G01N 2001/383; G01N 33/54366; G01N 35/10
See application file for complete search history.

(56) References Cited

U.S. PATENT DOCUMENTS

| | | | |
|---|---|---|---|
| 2003/0159999 A1* | 8/2003 | Oakey | B01D 57/02 210/695 |
| 2004/0206408 A1 | 10/2004 | Peters et al. | |
| 2007/0125942 A1 | 6/2007 | Kido | |
| 2010/0252118 A1* | 10/2010 | Fraden | B01L 3/502746 137/2 |
| 2013/0337578 A1 | 12/2013 | Delamarche et al. | |
| 2014/0051062 A1 | 2/2014 | Vanapalli et al. | |
| 2014/0246098 A1 | 9/2014 | Fraden et al. | |
| 2015/0044688 A1 | 2/2015 | Richter et al. | |
| 2015/0125947 A1 | 5/2015 | Korczyk et al. | |

OTHER PUBLICATIONS

Extended European Search Report for European Patent Application No. 16808519.9 dated Nov. 12, 2018.
Extended European Search Report for European Patent Application No. 18206472.5 dated Jan. 22, 2019.
Communication pursuant to Article 94(3) EPC from European Patent Application No. 18206472.5 dated Jan. 7, 2020.
Communication pursuant to Article 94(3) EPC from European Patent Application No. 18206472.5 dated Sep. 16, 2020, 5 sheets.

* cited by examiner

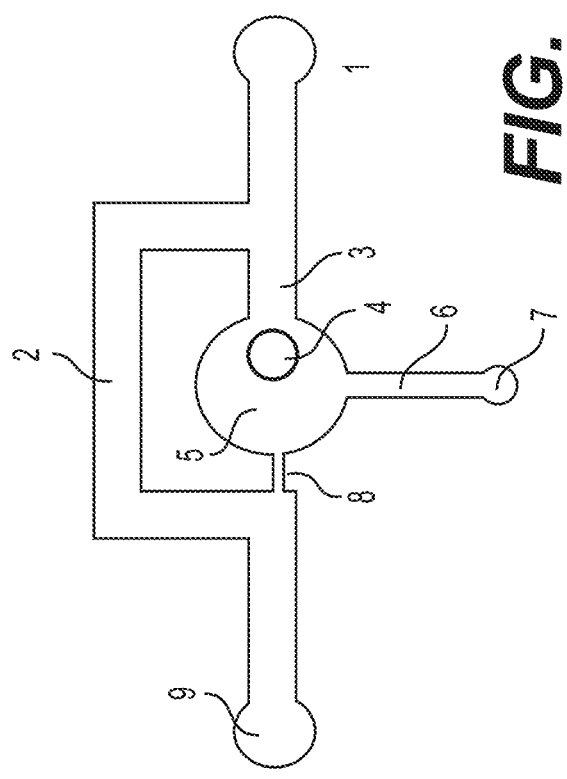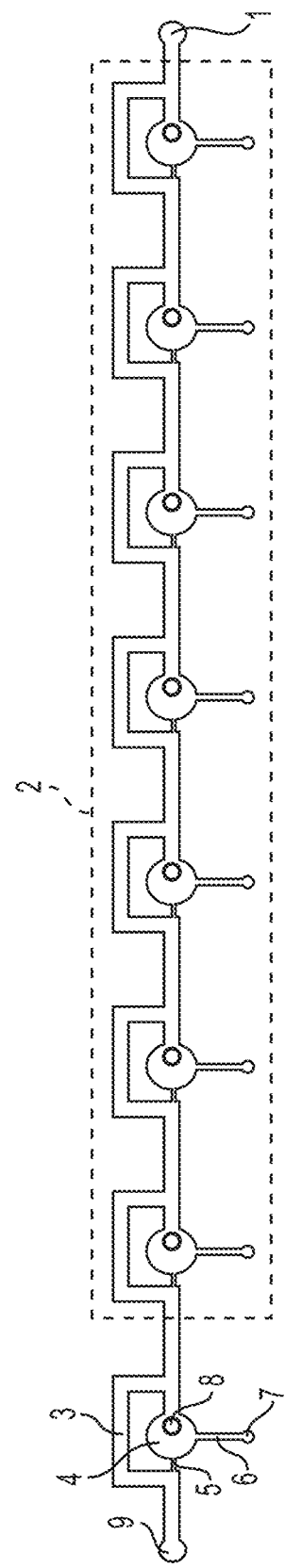
FIG. 11A
FIG. 11B

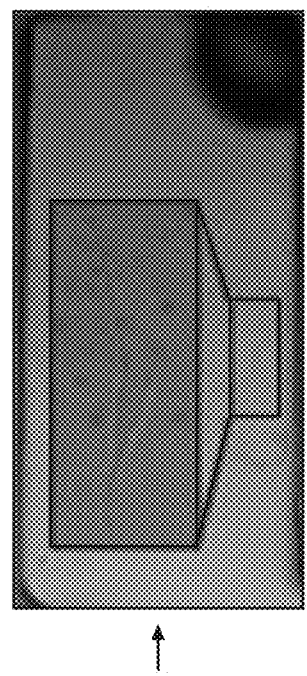
FIG. 17B
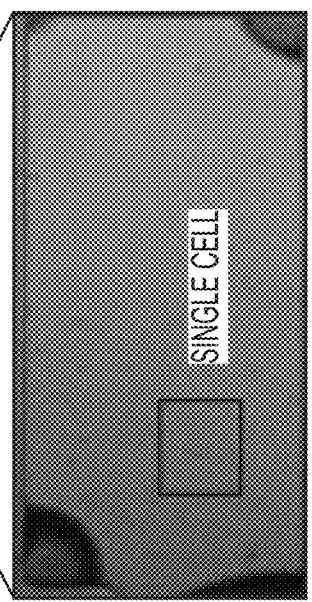
FIG. 17C
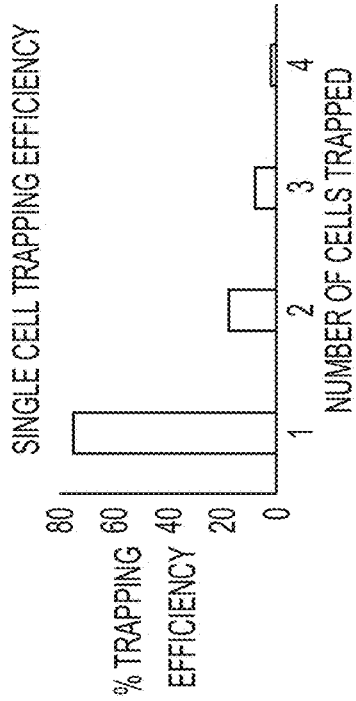
FIG. 17D
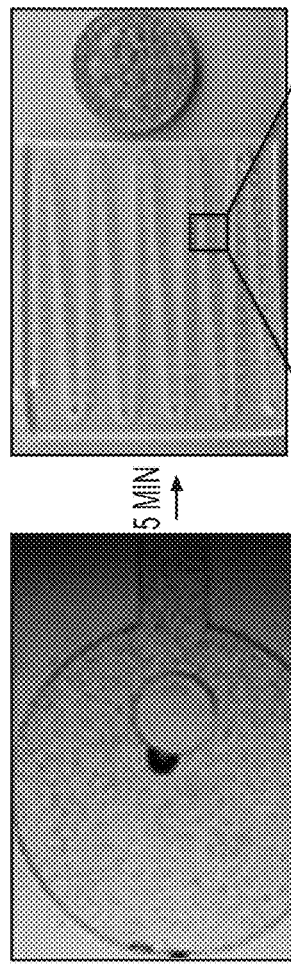
FIG. 17A
FIG. 17E

MANUAL OR ELECTRONIC PIPETTE DRIVEN WELL PLATE FOR NANO-LITER DROPLET STORAGE AND METHODS OF USING SAME

CROSS-REFERENCE TO RELATED APPLICATIONS

The present application claims priority to U.S. Provisional Application No. 62/174,310, filed on Jun. 11, 2015. The entirety of the aforementioned application is incorporated herein by reference.

TECHNICAL FIELD

This disclosure is generally related to well plates. More particularly, this disclosure is related to a pipette driven well plate for nano-liter droplet storage.

BACKGROUND

The general state of the art relates to microfluidic processes that can create and manipulate nano-liter droplets of fluid (see, e.g., U.S. Pat. No. 8,528,589 entitled "Manipulation of Microfluidic Droplets," Miller et al). Prior art involves creation of drops outside the array, using membranes as valves (see, e.g., WO2009139898, entitled "Valves And Other Flow Control In Fluidic Systems Including Microfluidic Systems," Abate et al), using pumps as valves (see, e.g., U.S. PGPUB 20050106066, entitled "Microfluidic Devices For Fluid Manipulation And Analysis," Saltsman et al.), using pressure controlled valves (see, e.g., WO2014138203, entitled "Microfluidic Devices For The Rapid And Automated Processing Of Sample Populations," Ben-Yakar et al.) to selectively merge different fluids or using electric charges (see, e.g., U.S. PGPUB 20100255556, entitled "Methods And Apparatus For Manipulation Of Fluidic Species," Hunt et al.) electro-coalescence (see, e.g., U.S. Pat. No. 2,920,982, entitled "Method Of Electrostatically Coating By Causing Coalescence Of Coating Droplets," Miller Emery P.) or fluids that have electrical properties (see, e.g., U.S. PGPUB 20110114190, entitled "Microfluidic Droplet Generation and/or Manipulation With Electrorheological Fluid," Wen et al.). Other technologies involve the use of separation media that can selectively be induced/removed to manipulate drop species in microfluidic devices (see, e.g., WO2004103565, entitled "Device And Method For Structuring Liquids And For Dosing Reaction Liquids Into Liquid Compartments Immersed In A Separation Medium," Baier et al.).

Currently, microfluidic static droplet arrays allow drops to be stored in "hydrodynamic traps" using an immiscible phase that is typically oil (see, e.g., U.S. Pat. No. 7,556,776, entitled "Microfluidic Manipulation of Fluids and Reactions," Fraden et al. and WO2012154688, entitled "Methods and Devices to Control Fluid Volumes, Reagent and Particle Concentration in Arrays of Microfluidic Drops," Bithi et al.). After these drops are stored, performing operations on selected drops in the array without effecting surrounding droplets is a complicated process involving integrating on-chip micro valves or other active valves that use deformable membranes to close/open fluidic connections to the stored droplets.

There are a number of disadvantages of the above-described current techniques. For example, current techniques to produce nano-liter drops in microfluidic devices require precise fluidic control and additional external manifolds. Likewise, the dilution mechanism of current passive methods can cause contamination of downstream traps in the array network. Additionally, current methods for diluting stored droplets achieve the same by coalescence with trapped droplet. Large volumes of dilutant are typically required to effect broad dilution ranges that are typically needed when screening bio-assays. Moreover, active methods use electrical, mechanical pressure on membranes or integrated vacuum pumps attached to the microfluidic device to manipulate their contents. These valves require multiple operations and complex logic based controls to manipulate the droplets. Further, most active methods are not compatible with pipette driven flow, this flow is typically non-precise and intermittent.

SUMMARY

Embodiments described herein overcome the disadvantages of the current techniques, and other disadvantages, described above. These advantages and others may be provided, for example, by a pipette driven well plate for nano-liter droplet storage. The pipette driven well plate may include an inlet, an outlet, a bypass channel, and a fluidic trap containing a valve covered by a removable covering, in which fluid enters the fluidic trap when the removable covering is removed and the fluid enters either the fluidic trap or the bypass channel, depending on which of the fluidic trap or bypass channel has the lower hydrodynamic resistance.

These advantages and others may be provided, for example, by a method for using a pipette driven well plate for nano-liter droplet storage. The method may include closing a valve located within a fluidic trap, introducing a first fluid to fill the fluidic trap and partially fill a bypass channel, opening the valve located within the fluidic trap, removing the first fluid surrounding the valve, and introducing a second fluid into the fluidic trap, in which the introducing results in a mixture of the first and second fluids.

BRIEF DESCRIPTION OF THE DRAWINGS

FIGS. 11A-11B show diagrams of a modification of the circular trap with a side arm of an embodiment of a manual or electronic pipette driven well plate for nano-liter droplet storage.

FIGS. 17A-17E show pictures and graphs of the operation of the device illustrated in FIG. 16.

DETAILED DESCRIPTION

Figure 1A:
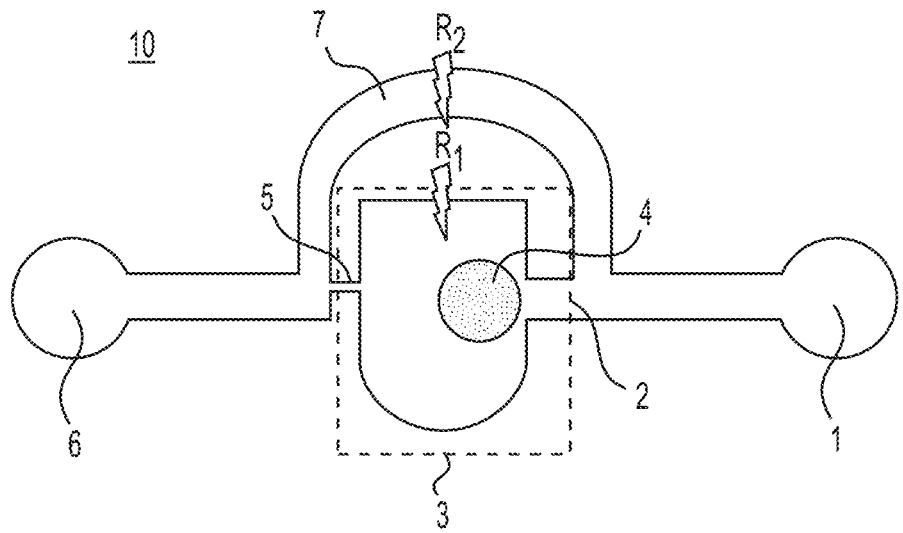
FIG. 1A shows a diagram of a single fluidic trap portion of an embodiment of a manual or electronic pipette driven well plate for nano-liter droplet storage.

Described herein are embodiments of a manual or electronic pipette driven well plate for nano-liter droplet storage. Also described herein are operations on selected drops in an array according to the embodiments. Also described are one-step serial dilutions in embodiments using atmospheric pressure as a unique valve. Embodiments may be used for DNA purification, polymerase chain reaction (PCR) assays, enzyme-linked immunosorbent (ELISA) based assays, and three-dimensional cell cultures. Embodiments may be used in the pharmaceutical industry for high throughput screening and cell based studies, point of care diagnostics, academic labs, contract research organizations, genomics industry, and drug testing. Embodiments overcome the problems described above. Embodiments overcome the problems of the prior art. For example, embodiments provide a new passive valve to overcome the problem with current state of the art droplet trapping and selective dilution. In embodiments, a valve is constructed by drilling a hole near the specially designed opening in each droplet trap. Each droplet trap is 2 mm in diameter and nearly 200 microns in height. This hole is positioned 200-500 μm from a channel, which is 500-micron meter in length and 200 microns in width leading to the trap. When the hole is open to the atmosphere the circuit between the trap (lower channel) and bypass channel (upper channel) is broken. When the hole is closed the circuit is complete.

In embodiments, the manual or electronic pipette driven well plate for nano-liter droplet storage device may be made with polydimethylsiloxane (PDMS), cyclic olefin copolymer (COC), polymethyl methacrylate (PMMA), polycarbonate (PC), or other polymers. In an embodiment, hydrophobic PDMS is bonded to a hydrophilic glass slide. Embodiments of the device include an inlet, an outlet, and the valve/hole in the hydrodynamic trap. The inlet and outlet remain open to atmospheric pressure during the entire process. The hole (herein the "valve") that is drilled into the trap is closed using a thin sheet of polymer, such as scotch tape. Fluid is introduced into the design using a manual or electronic pipette. Consequently, the fluid fills the hydrodynamic trap and excess fluid is pushed into a bypass channel. This increases the hydrodynamic resistance in the bypass channel. The valve is then opened to the atmosphere by removing the thin sheet of polymer (e.g., the scotch tape) from over the valve hole. A suction is then produced at the inlet, e.g., using a pipettor, causing the removal of fluid surrounding the valve to create a crescent shaped amount of fluid behind the valve (see, e.g., FIG. 6B). This crescent shaped fluid behind the valve is trapped owing to the high surface tension between the fluid and air in the small constriction situated downstream of the fluidic trap. A second reagent may then be introduced into the inlet to interact with the fluid stored behind the valve when in open state (see, e.g., FIG. 6C). The fluid introduced coalesces with the stored fluid to produce a mixture. The composition of this mixture can be varied using the speed of the mix cycle and the amount of second reagent for mixing a setting that is available in most commercially available electronic pipettes.

Embodiments use a total volume of 3 microliters for dilution. By changing the amount of fluid, number of mix cycles, and the speed of the mixing cycle, the original fluidic composition may be varied. Once operation on the droplet is complete the diluting plug is removed from the stored drop and the valve is again closed using the polymer film (e.g., scotch tape). Subsequently, any fluid that enters the inlet cannot access this droplet as the air trapped (caused before closing the valve when diluting the plug is sucked back into the inlet) between the valve and the connecting channel that is in turn connected to the inlet acts as a barrier. This causes the fluid being injected to pass into the bypass channel and into subsequent connected traps present in the array. When the valve is open the fluid passes again into the lower channel to interact with the stored droplet. This method, therefore, allows one-step serial dilution that can be controlled by changing the speed or the volume of plug in the electronic pipette. Hard-wired operations on any selected drop in the array without changing the composition or contaminating other droplets in the array can, therefore, be performed. High-throughput screening operations of nano-liter drops may be conducted using just a pipettor. The coefficient of variation for the one step serial dilution is typically less than 10%. Increasing the pipetting accuracy of the electronic pipettor can further reduce this coefficient of variation.

Figure 1B:
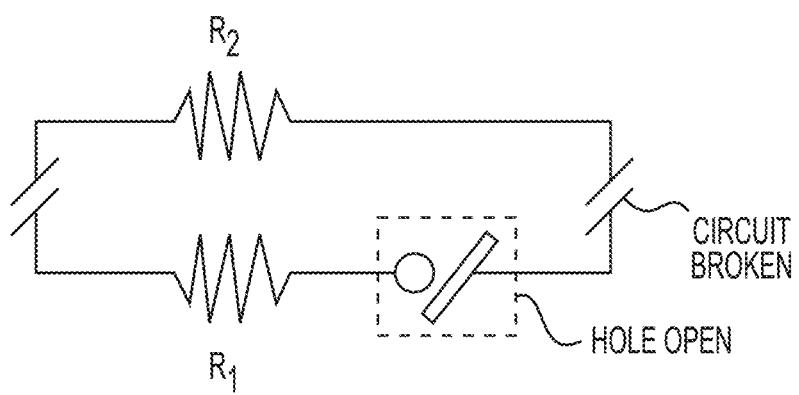
FIG. 1B-1C show electrical analogy circuits of a single fluidic trap portion of an embodiment of a manual or electronic pipette driven well plate for nano-liter droplet storage.
Figure 1C:
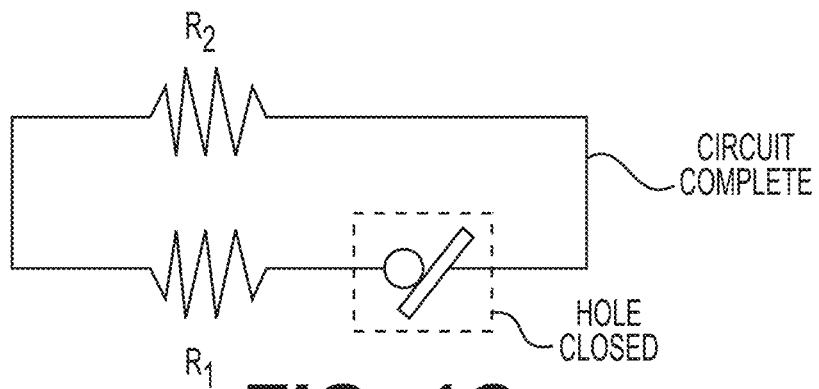

FIG. 1A shows a diagram of a single fluidic trap portion 10 of an embodiment of a manual or electronic pipette driven well plate for nano-liter droplet storage. The diagram illustrates a single fluidic trap portion 10 that includes a pipette tip inlet 1, an extended channel 2 from fluidic trap 3 to prevent contamination when drilled valve 4 is closed, the fluidic trap 3, e.g., with a half circle radius of 1 mm and hydrodynamic resistance R1, the drilled valve 4, e.g., with a height of ~4mm and diameter of 0.5 mm, constriction piping for air 5, e.g., with width of 90 µm and length of 500 µm preventing the contents in the fluidic trap from escaping, fluidic outlet 6 and bypass channel or upper branch 7. R1 and R2, shown in FIG. 1A, refer to the upper and lower branch hydrodynamic resistances, respectively. With reference to FIGS. 1B-1C, shown are electrical analogy circuits of the single fluidic trap portion 10. In the electrical analogy circuits, the hydrodynamic resistances of the upper channel (R1) and lower trap (R2) are connected in parallel. As shown in FIG. 1B, when the valve 4 in the trap 3 is open to the atmosphere, the circuit is broken and the fluid first enters the valve 4. As shown in FIG. 1C, when the valve 4 is closed the circuit is complete and the fluid now enters the path with the least hydrodynamic resistance, which is part 7 in FIG. 1A.

Figure 2A:
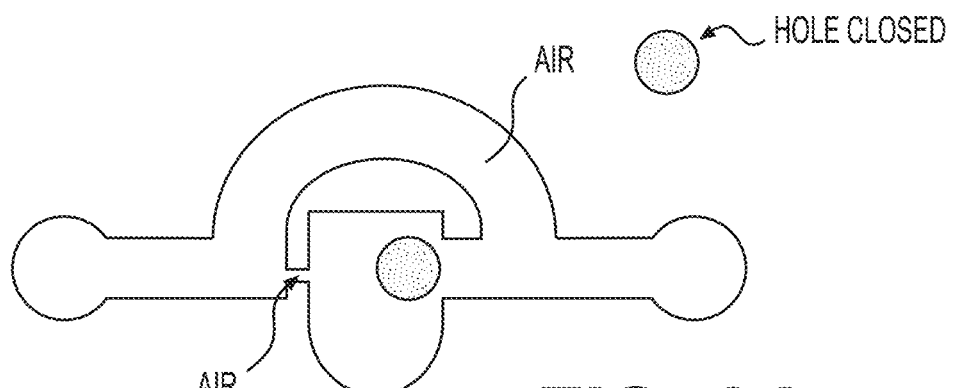
FIGS. 2A-2C show diagrams of a single fluidic trap portion of an embodiment of a manual or electronic pipette driven well plate for nano-liter droplet storage that illustrate a procedure or method for filling the fluidic trap.
Figure 2B:
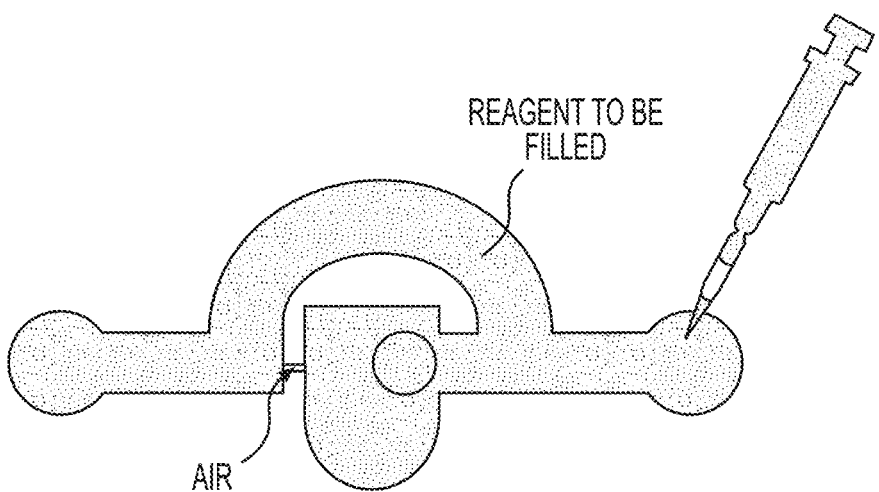
Figure 2C:
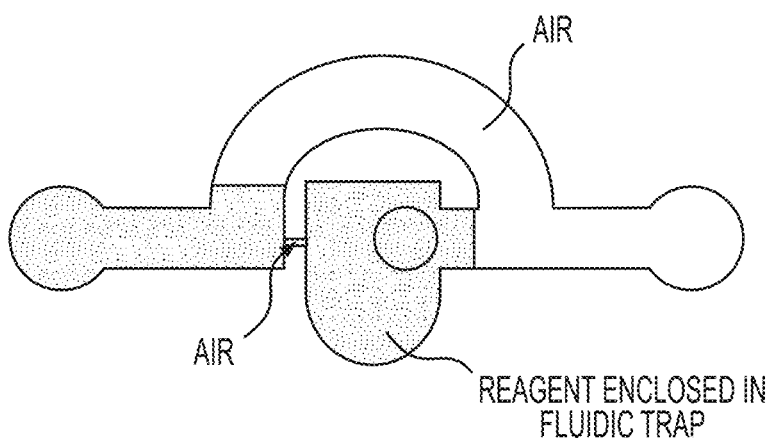

FIGS. 2A-2C show diagrams of a single fluidic trap portion 10 of an embodiment of a manual or electronic pipette driven well plate for nano-liter droplet storage that illustrate a procedure or method for filling the fluidic trap 3. The valve 4 is closed (FIG. 2A) and the reagent A fluid is injected with a pipette tip into inlet 1 with a pipettor (FIG. 2B). This causes the fluidic trap 3 to be filled with the reagent A fluid. A small amount of the reagent A fluid is left in the bypass channel 7 to enable effective dilution (FIG. 2C).

Figure 3A:
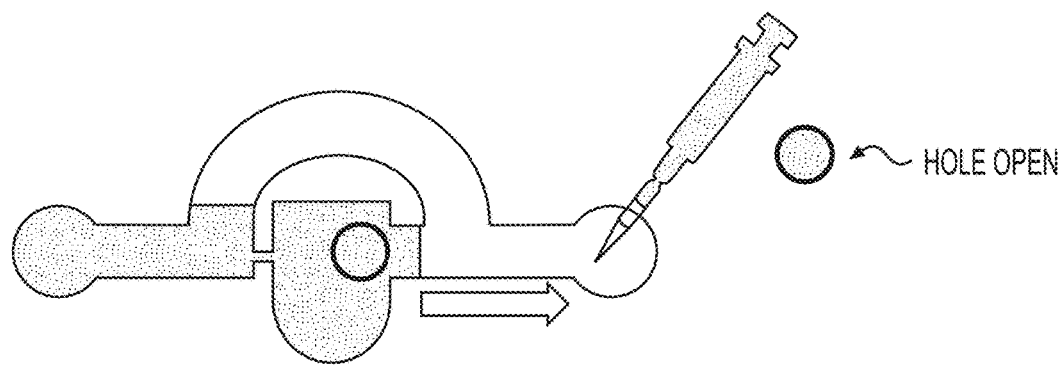
FIGS. 3A-3D show diagrams of a single fluidic trap portion of an embodiment of a manual or electronic pipette driven well plate for nano-liter droplet storage that illustrate a procedure or method for cleaning channels before dilution.
Figure 3B:
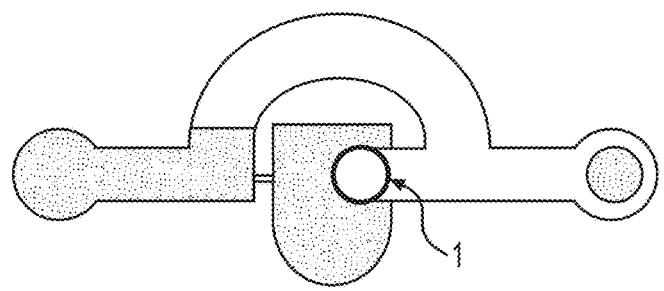
Figure 3C:
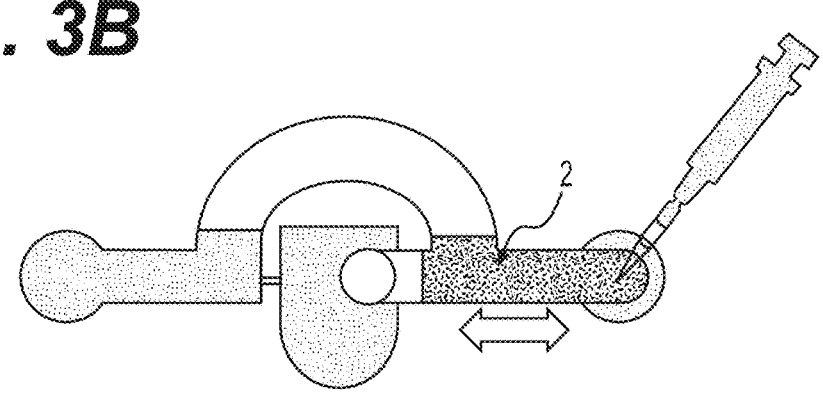
Figure 3D:
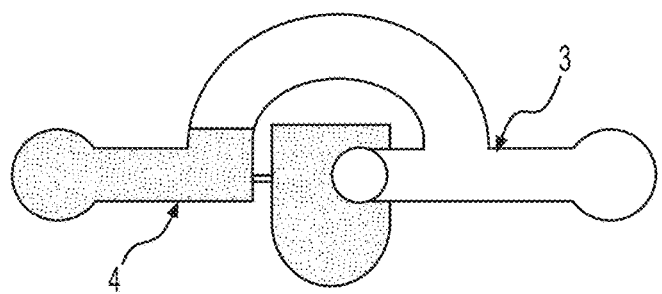

FIGS. 3A-3D show diagrams of a single fluidic trap portion 10 of an embodiment of a manual or electronic pipette driven well plate for nano-liter droplet storage that illustrate a procedure or method for cleaning channels before dilution. The valve 4 is opened and suction is applied at the inlet 1 (FIG. 3A). This causes the reagent A fluid around the valve 4 to be removed, leaving a crescent-shaped volume of fluid in the fluidic trap 3. The valve 4 is then closed and cleaning fluid is passed or injected through the inlet 1 to remove any leftover reagent A fluid that is in the upper channel 7 (FIG. 3C). Some amount of the reagent A fluid however remains in the bypass channel 7, which increases the resistance R2 of the bypass channel 7, preventing other fluids from entering the bypass channel 7 when valve 4 is open (FIG. 3D).

Figure 4A:
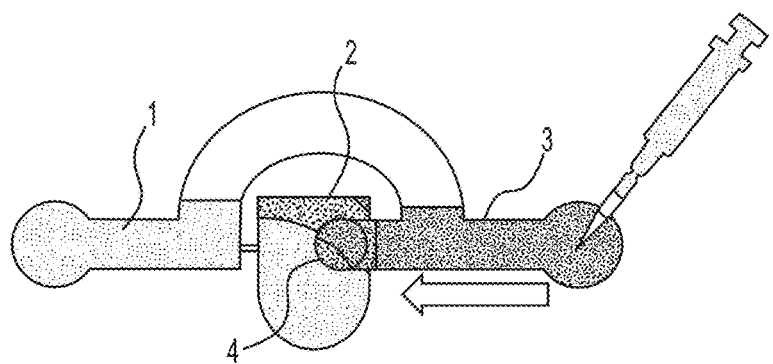
FIGS. 4A-4D show diagrams of a single fluidic trap portion of an embodiment of a manual or electronic pipette driven well plate for nano-liter droplet storage that illustrate a procedure or method for diluting contents in the fluidic trap.
Figure 4B:
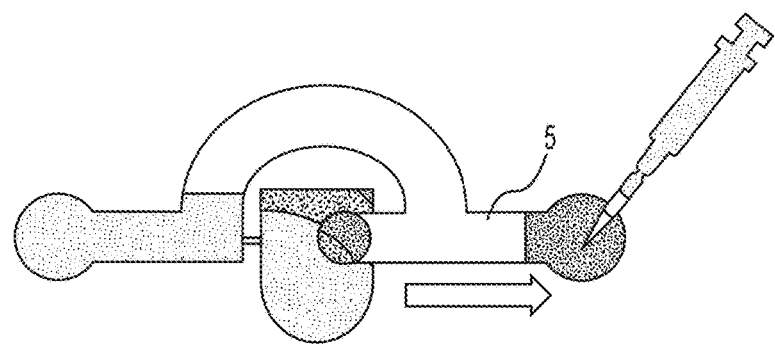
Figure 4C:
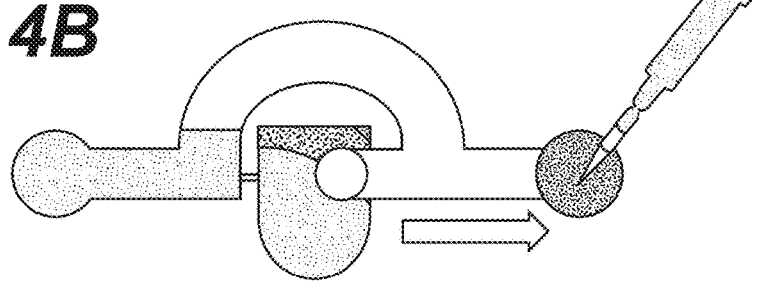
Figure 4D:
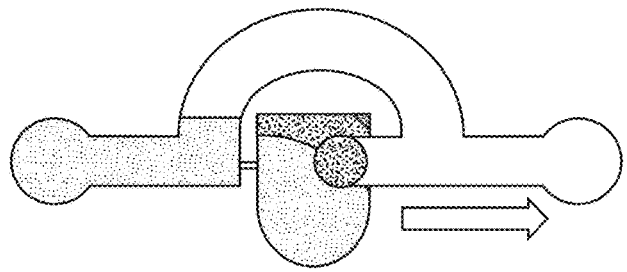

FIGS. 4A-4D show diagrams of a single fluidic trap portion 10 of an embodiment of a manual or electronic pipette driven well plate for nano-liter droplet storage that illustrate a procedure or method for diluting contents in the fluidic trap 3. As noted above, a portion of the reagent A fluid remains in bypass channel 7, preventing other fluid from entering the bypass channel 7 when the valve 4 is open. The valve 4 is opened and dilutant fluid (e.g., reagent B fluid) is injected into the inlet 1 with a pipettor (FIG. 4A). Dilutant fluid enters the fluidic trap 3 and coalesces with the stored reagent A droplet, effecting advective and diffusive mixing in the fluidic trap 3. After contents of the fluidic trap 3 are diluted, the dilutant fluid is removed back via the pipette using a suction force created by the pipettor (FIG. 4B). This completes the dilution state, during which the valve 4 is open. The valve 4 is then closed and extra dilutant fluid in the bypass channel 7 is pulled back via suction into the pipette (FIGS. 4C-4D). Note that the dilutant fluid being removed will not interact with the stored droplet due to the air between the valve 4 and the main channel depicted as 3 in FIG. 1A.

Figure 5:
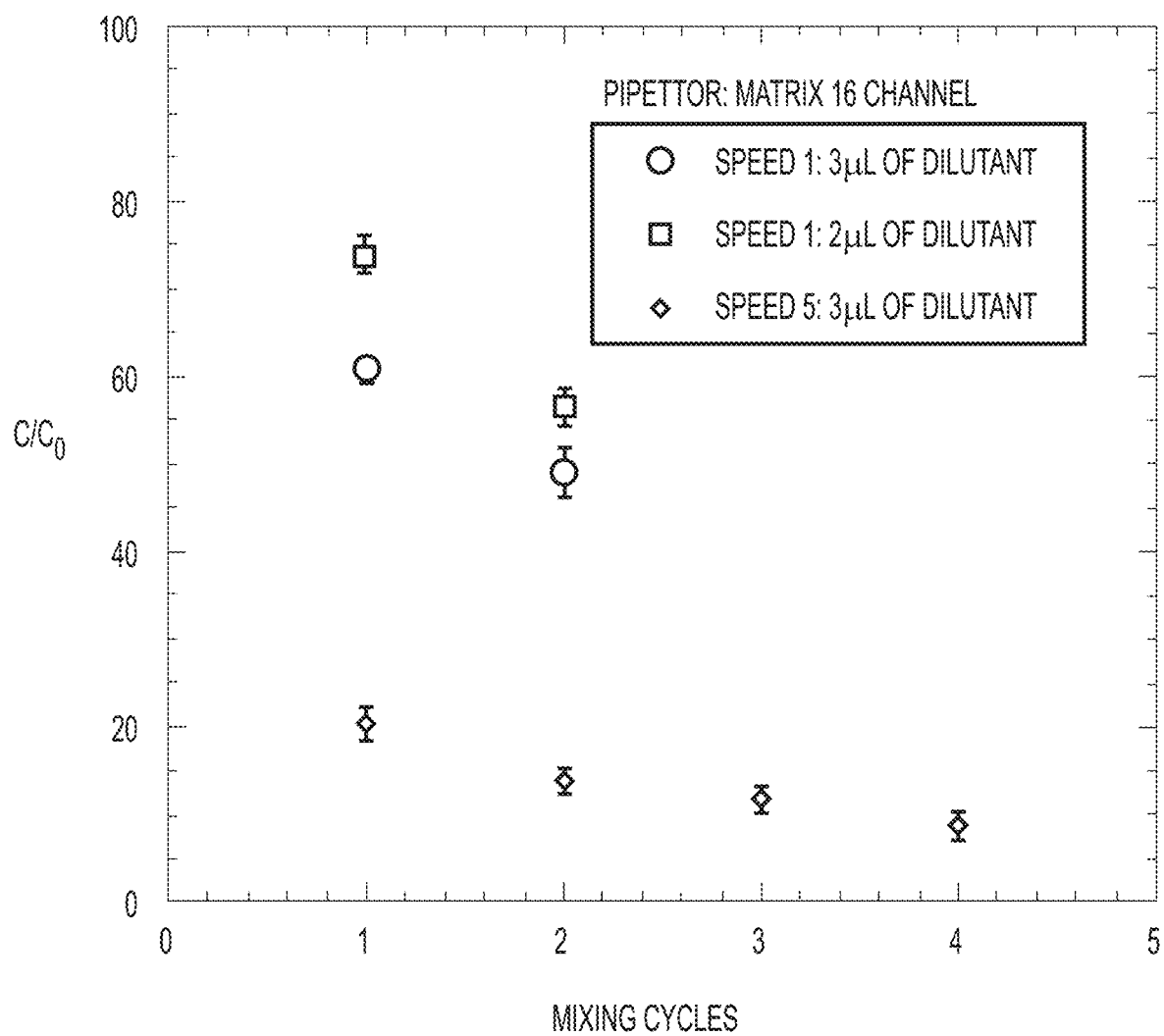
FIG. 5 is a graph showing the extent of mixing in an embodiment of a manual or electronic pipette driven well plate for nano-liter droplet storage using various amounts of dilutant by changing the pipetting mixing speed using a commercially available electronic pipette.

FIG. 5 shows a graph showing the extent of mixing in an embodiment of a manual or electronic pipette driven well plate for nano-liter droplet storage using various amounts of dilutant by changing the pipetting mixing speed using a commercially available electronic pipette (e.g., Matrix Tech. Corp. electronic multichannel pipette). Error bars indicate standard deviation for n=5 measurements.

Figure 6A:
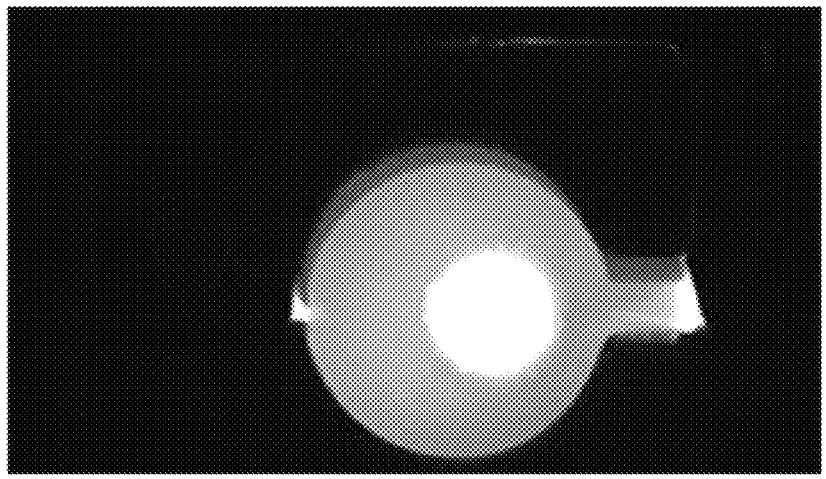
FIGS. 6A-6E show micrograph images of an embodiment of a manual or electronic pipette driven well plate for nano-liter droplet storage illustrating a procedure or method of diluting a droplet using the passive valve of such embodiment.
Figure 6B:
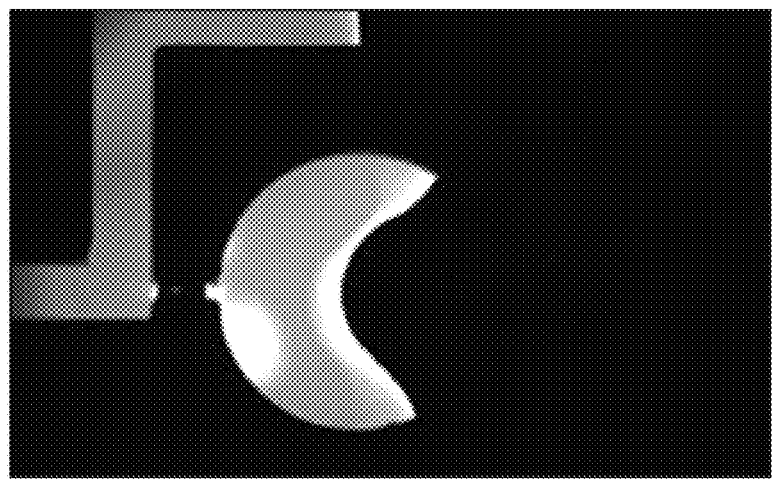
Figure 6C:
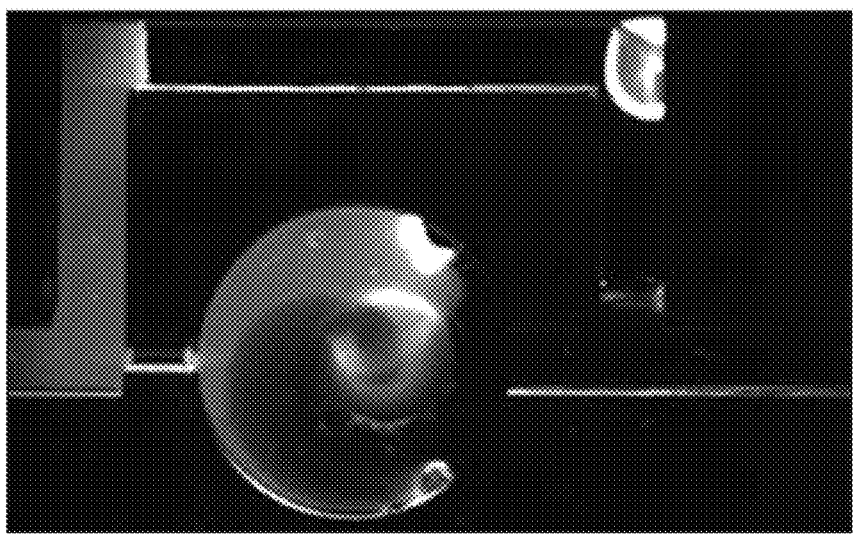
Figure 6D:
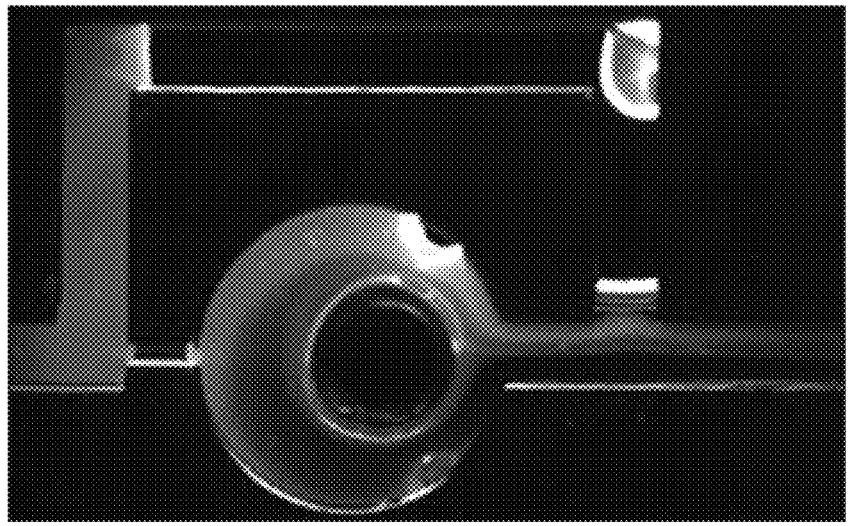
Figure 6E:
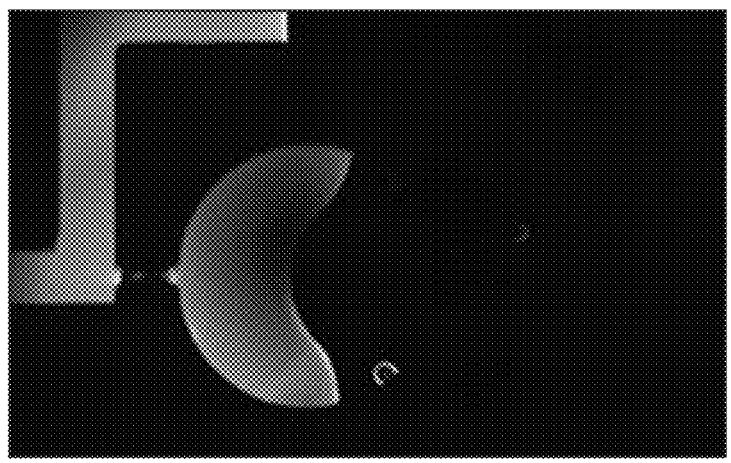

FIGS. 6A-6E show micrograph images of an embodiment of a manual or electronic pipette driven well plate for nano-liter droplet storage illustrating a procedure or method of diluting a droplet using the passive valve of such embodiment. In FIGS. 6A, the valve 4 is closed and a droplet of reagent A is stored in fluidic trap 3. In FIG. 6B, the valve 4 is open and fluid around the valve 4 is evacuated using suction from a pipette at the inlet 1 (leaving a crescent shaped droplet). In FIG. 6C, the diluting fluid or reagent B is introduced into the inlet 1 with valve 4 in an open state, in which reagent B coalesces with the stored crescent shaped drop of reagent A, and mixing occurs. In FIG. 6D, after the mixing cycle is complete, extra fluid is sucked back into the pipette with the valve 4 in open state. In FIG. 6E, fluid in the trap 3 is now diluted and valve 4 is closed.

Figure 7A:
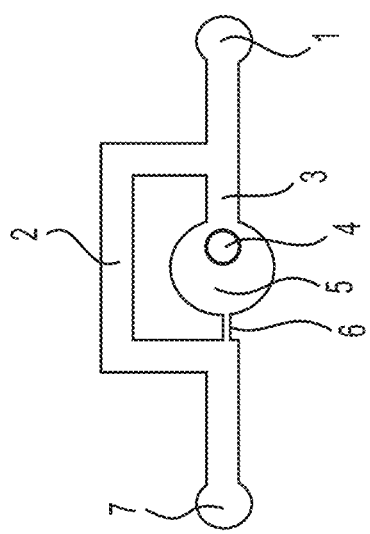
FIGS. 7A-7B show diagrams of different embodiments of an embodiment of a manual or electronic pipette driven well plate for nano-liter droplet storage.
Figure 7B:
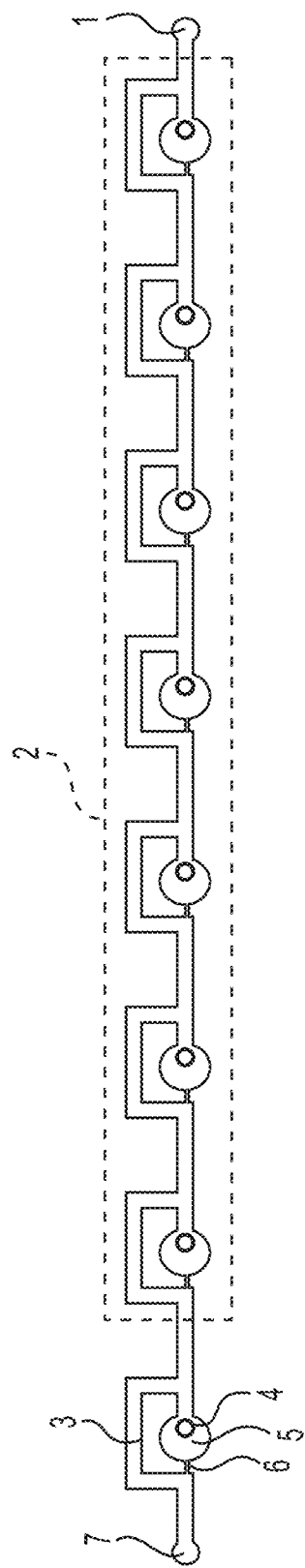

FIGS. 7A-7B show diagrams of different embodiments of the present disclosure. FIG. 7A shows a trap that is circular in geometry having an inlet 1, extended channel upstream of the trap 2 to prevent contamination if the trap 2 is connected in series to other similar traps, drilled valve 4 , circular trap 5 , air based constriction 6, and outlet 7. FIG. 7B shows a series of circular traps with drilled valves 4 that are connected in series to each other with inlet 1, a series of circular traps each having bypass channel 3, drilled valve 4, circular trap 5, air based constriction 6, and outlet 7.

Figure 8B:
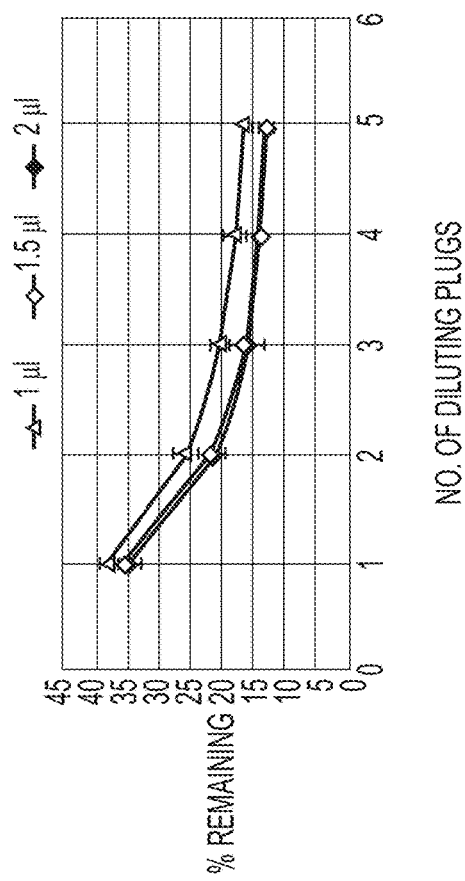
FIGS. 8A-8B show graphs of dilution carried out using an electronic pipette of an embodiment of a manual or electronic pipette driven well plate for nano-liter droplet storage.
Figure 8A:
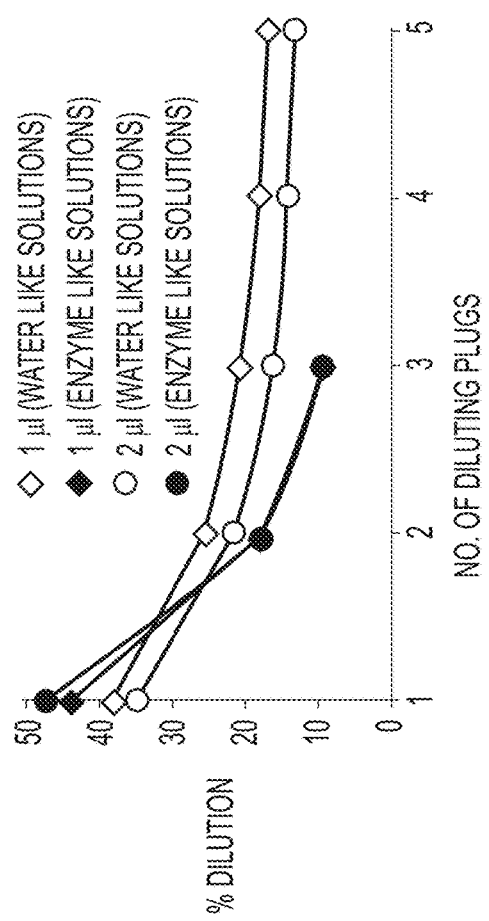

FIGS. 8A-8B show graphs of dilution carried out using an electronic pipette (e.g., Matrix Tech. Corp. electronic multichannel pipette). FIG. 8A shows the percentage of dilution accomplished in a trapped drop where valve 4 is open and dilutant fluid enters the inlet 1 and exits directly through the valve 4. FIG. 8A shows a profile for two different fluids at different volumes of dilutant fluid as function of the number of diluting plugs used. FIG. 8B shows a similar graph for water-like fluids of different volumes as a function of remaining concentration of original fluid in the trap 3 vs. the number of diluting plugs that are used for dilution.

Figures 9A, 9B:
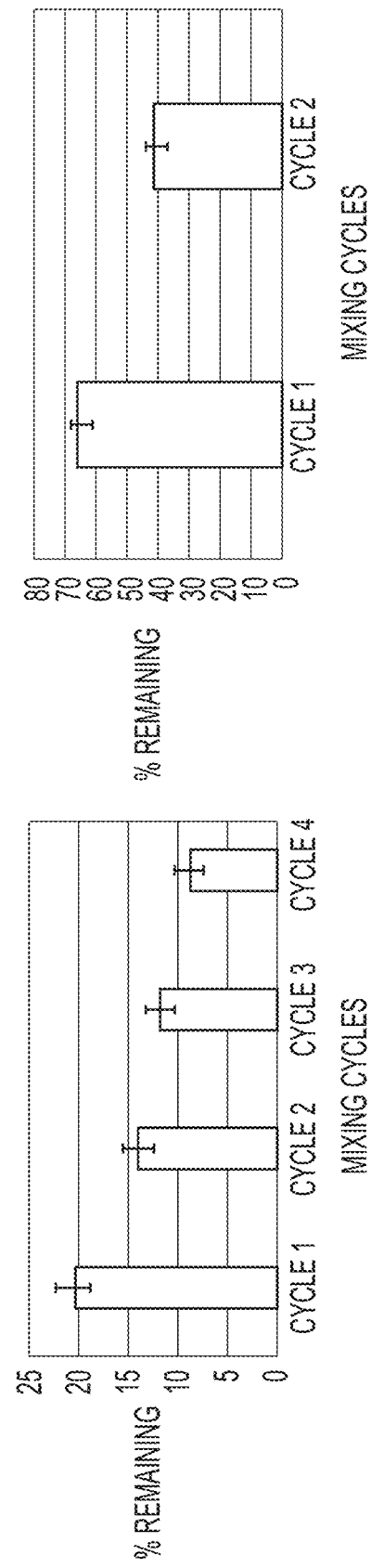
FIGS. 9A-9B show various dilution profiles for schematics shown in FIG. 7A using the mixing function with an electronic pipettor of an embodiment of a manual or electronic pipette driven well plate for nano-liter droplet storage.

FIGS. 9A-9B show various dilution profiles for schematics shown in FIG. 7A using the mixing function with an electronic pipettor. In these graphs, fluid enters through the inlet 1 and interacts with the stored droplet when the hole 4 is open, and after the operation the fluid retracts back into the pipette tip. FIG. 9A is a graph of dilution range (expressed here as % normalized concentration in the trapped droplet) against the number of mixing cycles performed. Here, speed is fixed at setting 5 and the volume of dilutant is also fixed at 2 µL. FIG. 9B shows a similar graph of dilution range against the number of mixing cycles performed. Here, speed is fixed at setting 5 and volume of dilutant is fixed at 1 µL.

One of ordinary skill in the art would readily recognize that speed and volume of dilatant may be set to any value.

Figure 10:
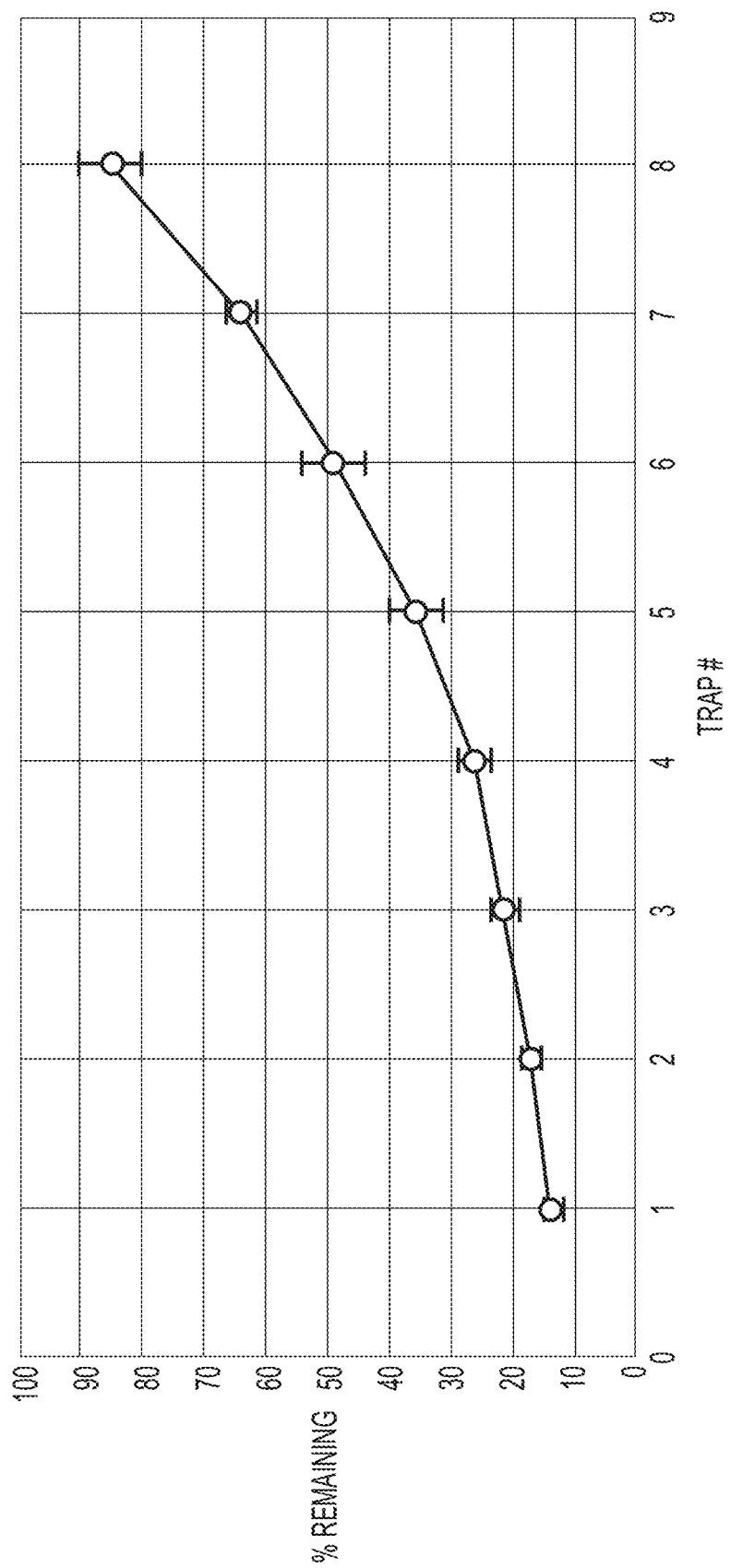
FIG. 10 shows a dilution profile for the schematic in FIG. 7B.

FIG. 10 shows the dilution profile for the schematic in FIG. 7B (array of traps), and the operation that was used in this case was mixing. Mixing was performed sequentially or selectively in the traps by opening the selected trap and closing the other traps to prevent contamination.

FIGS. 11A-11B show diagrams of a modification of the circular trap 5 with a side arm 6. The side arm 6 when closed allows normal operation of the trap 5 for fluidic operations such as trapping, and when open allows extraction of the contents of the trap 5 via the side arm outlet 7. This can be particularly useful for applications such as single cell trapping, where a single cell can be trapped and removed from the side arm outlet 7 for further processing e.g., in micro well plates. FIG. 9B represents an array 2 of the aforementioned traps 5 with side arms 6 connected to each other in a series arrangement. In FIG. 11B, 1 represents the inlet, 2 an array of traps with side arms 6 connected in series, 3 the bypass channel, 4 is the trap, 5 is the air based constriction, 6 is the sidearm, 7 is the outlet of the side arm, 8 is the drilled valve of the trap 4, and 9 is the outlet of the trap 4.

Figure 12A:
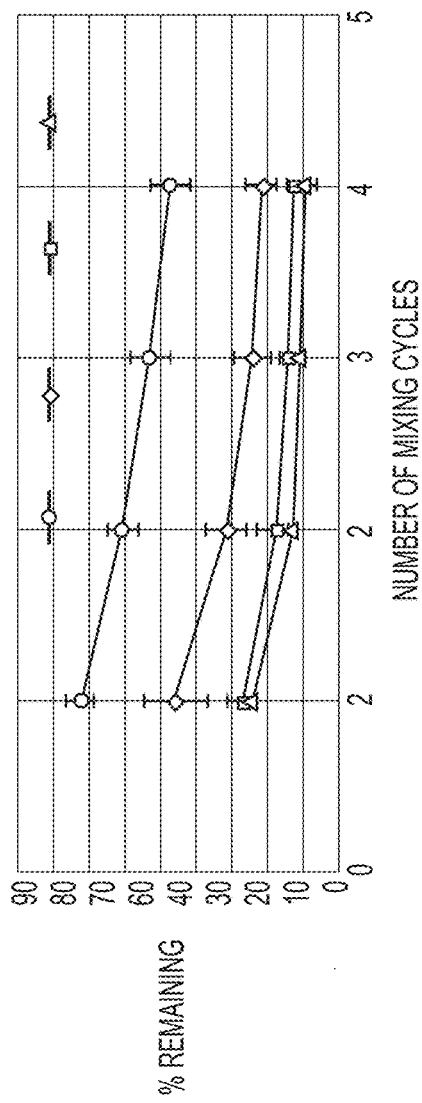
FIGS. 12A-12B are graphs of dilution using the mixing function for the schematics of designs described in FIGS. 11A-11B, respectively.
Figure 12B:
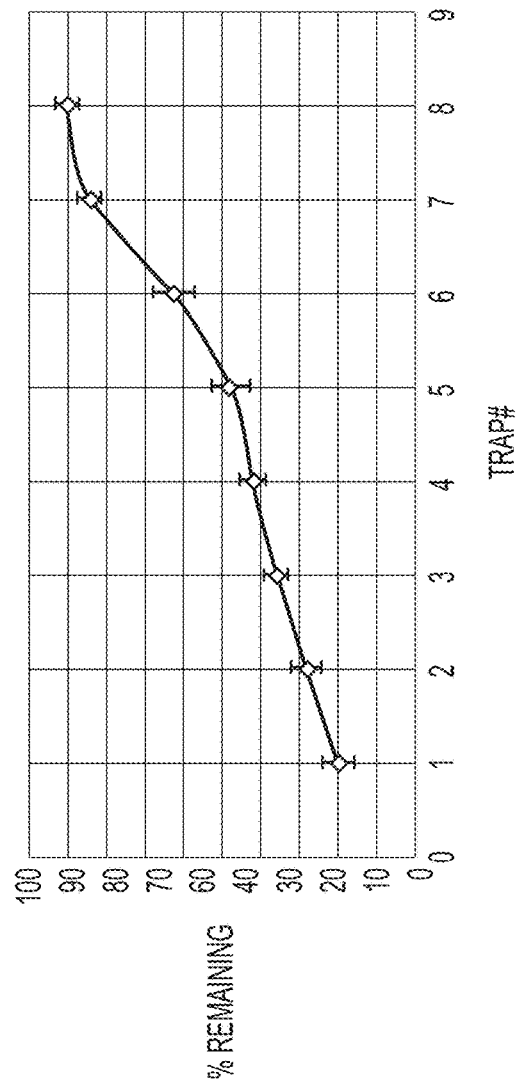

FIGS. 12A-B show graphs of dilution using the mixing function for the schematics of designs described in FIGS. 11A-B, respectively. FIG. 12A shows the dilution profile at various volumes of dilatant fluid as a function of the number of mixing cycles. FIG. 12B shows the dilution profile for an array of traps for the schematic shown in FIG. 11B. The volume of dilutant fluid was set to 10 μL.

Figure 13:
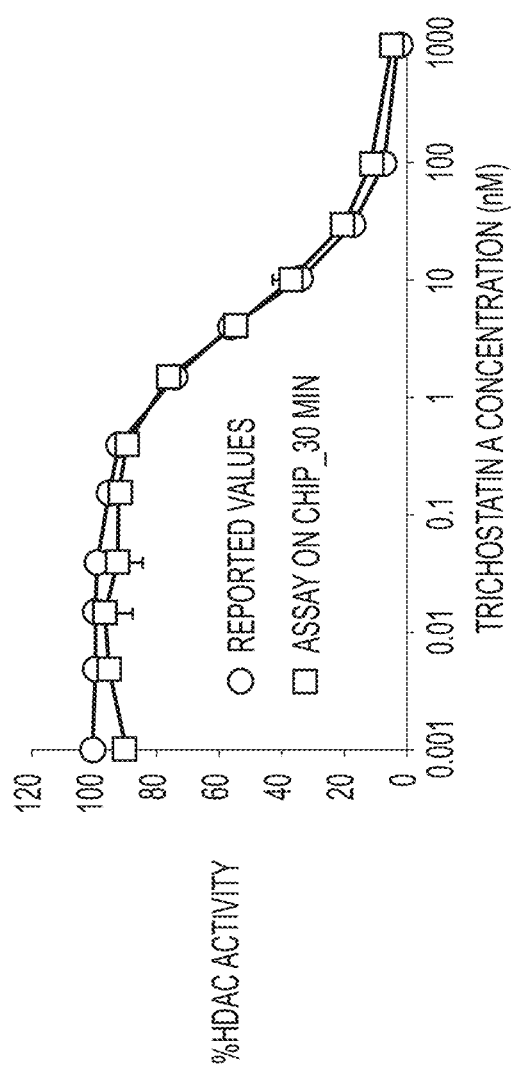
FIG. 13 is a graph of HDAC assay standard curve generated using the design shown in schematic FIG. 7A.

FIG. 13 shows a graph of HDAC assay standard curve generated using the design shown in FIG. 7A. The data obtained from the design is designated as "Assay On chip" in this graph.

Figure 14A:
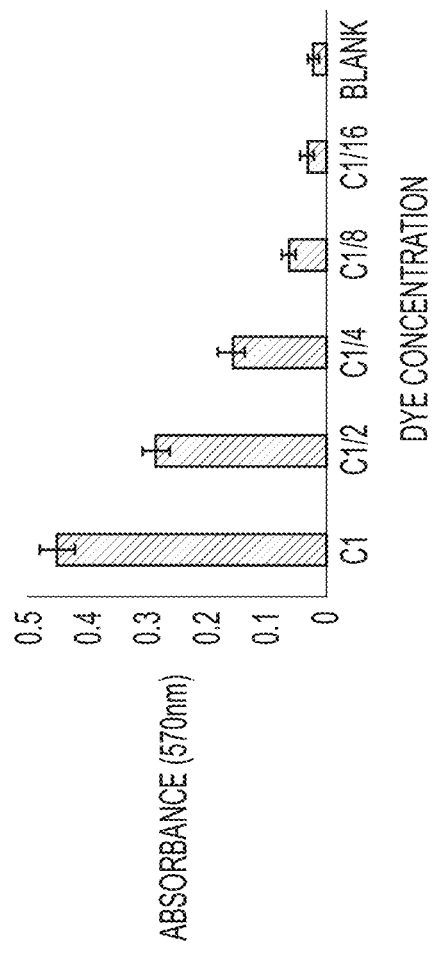
FIGS. 14A-14B show readings on a well plate reader for different concentrations of dye and fluorescein solutions, respectively, for fluids trapped using the technique described in FIG. 7A of an embodiment of a manual or electronic pipette driven well plate for nano-liter droplet storage.
Figure 14B:
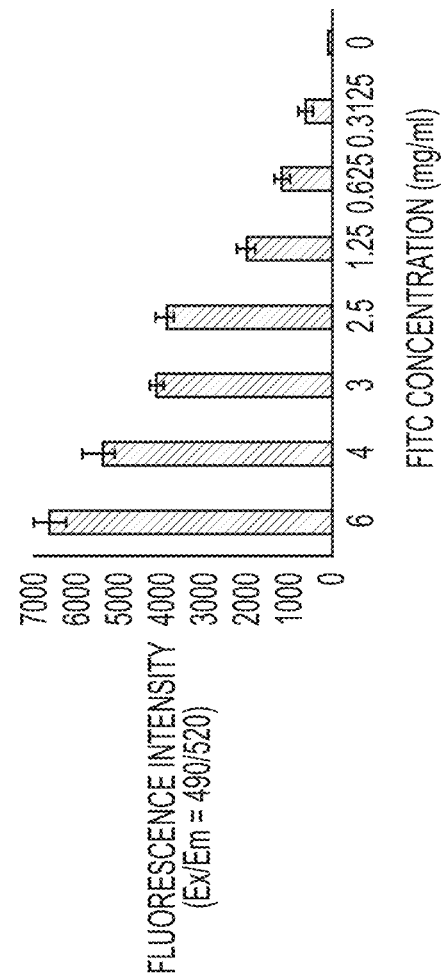

FIGS. 14A-B show readings on a well plate reader for different concentrations of dye and fluorescein solutions, respectively, for fluids trapped using the technique described in FIG. 7A.

Figure 15A:
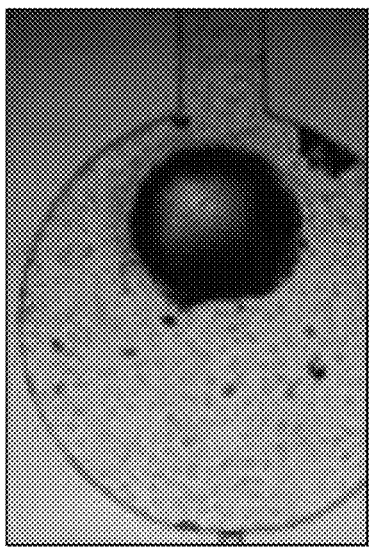
FIGS. 15A-15C show dilutions of cells in media after they are loaded in the schematic of design FIG. 7A of an embodiment of a manual or electronic pipette driven well plate for nano-liter droplet storage.
Figure 15B:
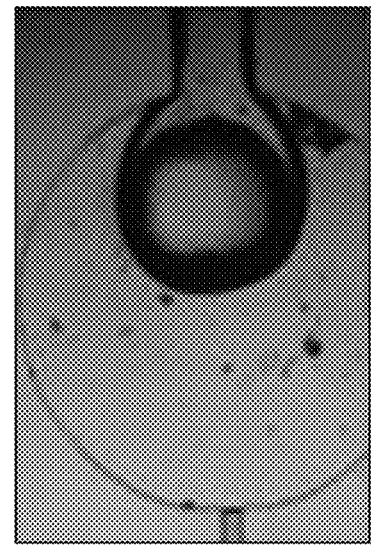
Figure 15C:
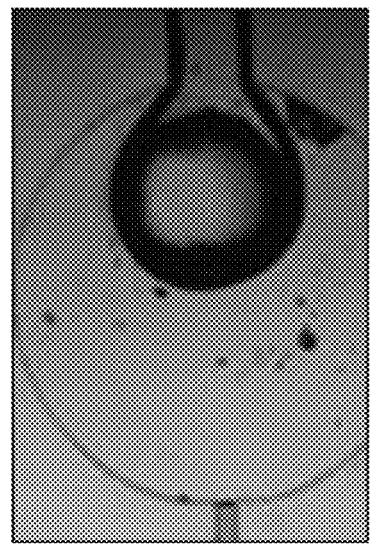
Figure 15D:
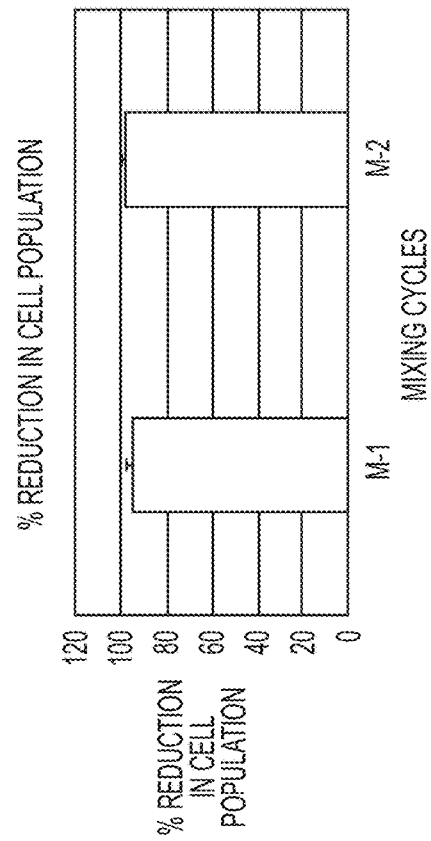
FIG. 15D shows a graph of the reduction in population of the cells in the trap using mixing function in an electronic pipette as a function of mixing cycles.

FIGS. 15A-C show dilutions of cells in media after they are loaded in the schematic of FIG. 7A. FIG. 15D shows a graph of the reduction in population of the cells in the trap using mixing function in an electronic pipette as a function of mixing cycles.

Figure 16:
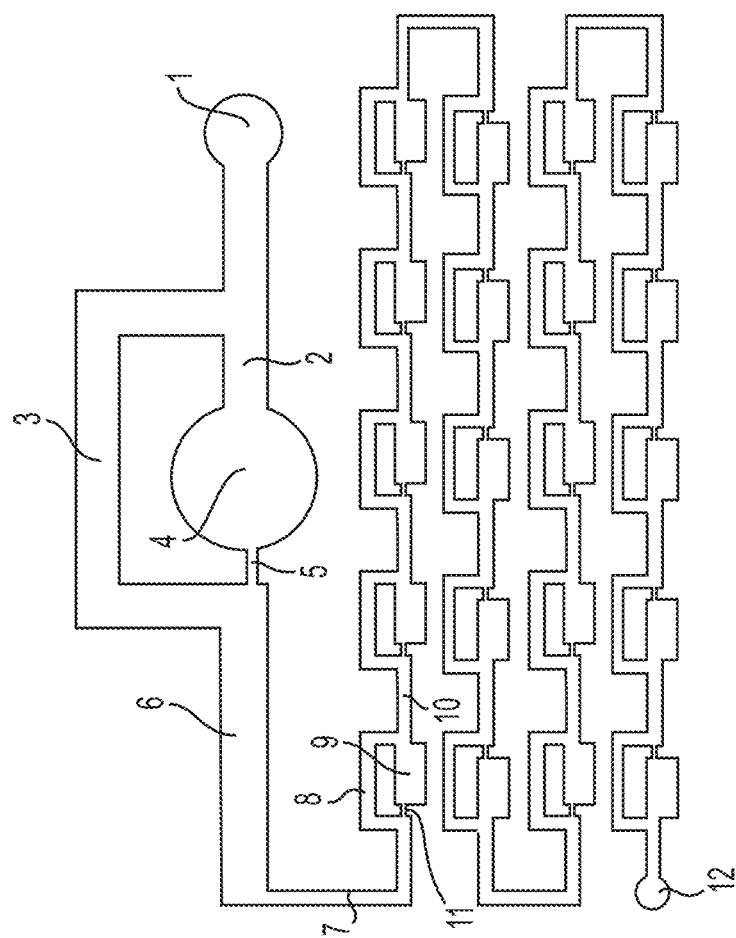
FIG. 16 shows a schematic to achieve single cell trapping with the design illustrated in FIG. 7A.

FIG. 16 shows a schematic to achieve single cell trapping with the design described above with reference to FIG. 7A, albeit that no hole/valve is required to be present in the trap while operating this design. A parent "large trap" 4 with elongated entrance to trap 2 and having inlet 1, bypass channel 3, constriction 5 connecting large channel 6 and constricted channel 7 immediately downstream is shown. Smaller rectangular traps 9 with dimensions of 1 mm width and 0.5 mm breadth are connected downstream of the parent trap with their outlets facing the parent trap. Each smaller trap has an inlet to trap 10, air based constriction 11, bypass channel 8 and inlet 12. To operate this device, a solution containing cells (e.g., 6000 cells/μL) is first introduced into the parent trap 4 using a pipettor until it fills the trap, excess solution is then removed from the bypass channel by pulling back the fluid using a pipettor. The connected smaller traps are prefilled with media or other solutions using the same method. Media solution is then passed through inlet 1 of the parent trap followed by a plug of air using a pipettor, and the media collects a small number of cells from the parent trap and consequently deposits the cells into the smaller traps, excess media then leaves the device through 12.

FIGS. 17A-E show pictures and graphs of the operation of the device described in FIG. 16. FIG. 17A shows a suspension of cells loaded into the parent trap, FIG. 17B shows an array of smaller traps that are connected to the parent trap, FIG. 17C shows single cells trapped in the smaller traps after the operation, FIG. 17D shows the single cell after a period of 24 hours where they are cultured in the trap, and FIG. 17E shows the trapping efficiency of the device for 1, 2 and 3 cells.

Figure 18:
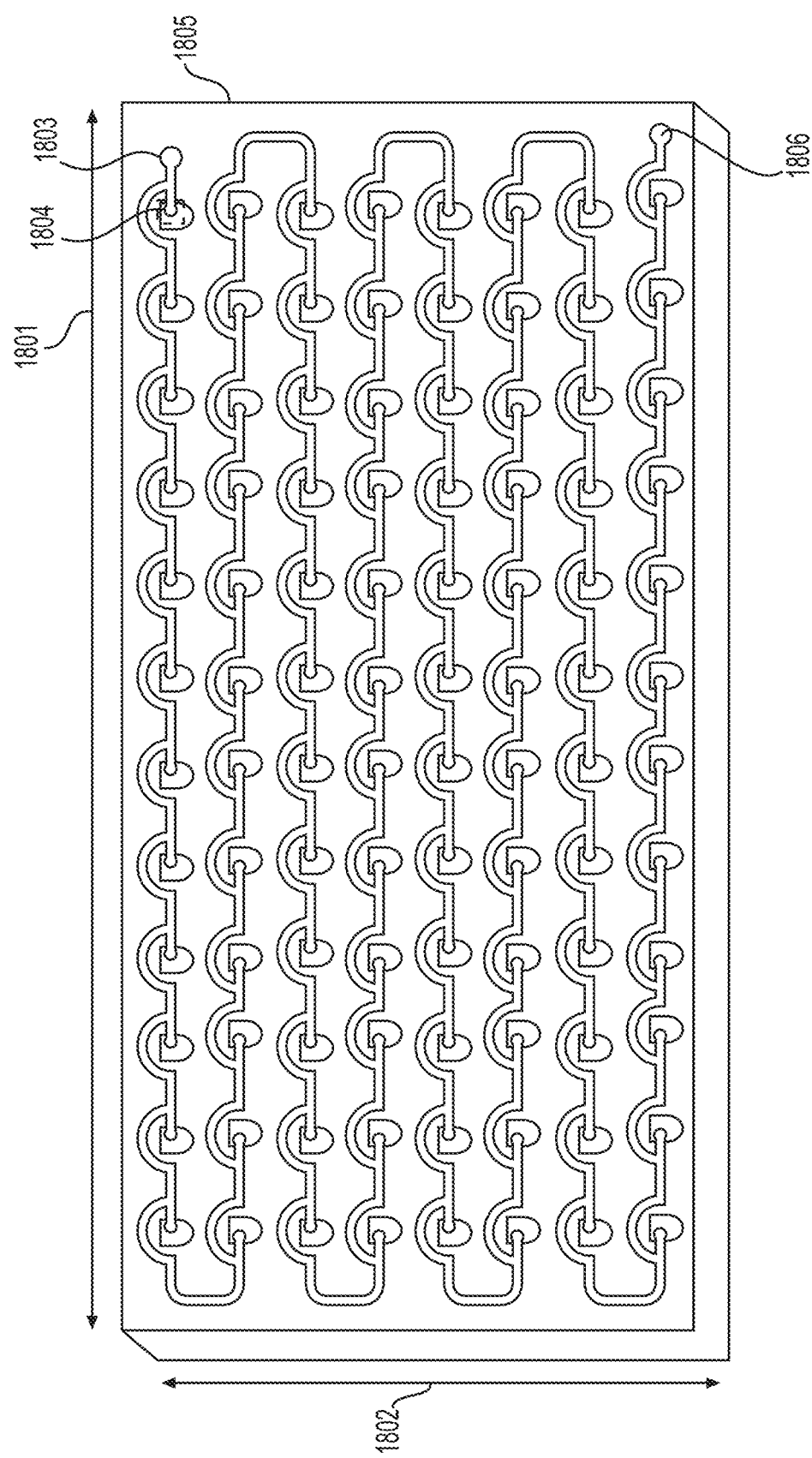
FIG. 18 shows an embodiment of manual or electronic pipette driven well plate for nano-liter droplet storage including an array of connected 96 fluidic traps.

With reference now to FIG. 18, shown is an embodiment of manual or electronic pipette driven well plate 1805 for nano-liter droplet storage including an array of connected 96 fluidic traps. Well-plate 1805 includes an array of fluidic traps (e.g., fluidic trap portions 10 shown in FIGS. 1A-6E) connected to each other in the format of a well plate. The array of fluidic traps may be injection molded or micro machined in a polymer, such as COC. In the embodiment shown, array/well-plate 1805 has a length 1801 of 12.78 cm, a width 1802 of 8.55 cm, inlet 1803 for the array of traps, drilled hole or valve 1804 present in each of the fluidic traps, and outlet 1806 for the array 1805 of traps.

Figure 19:
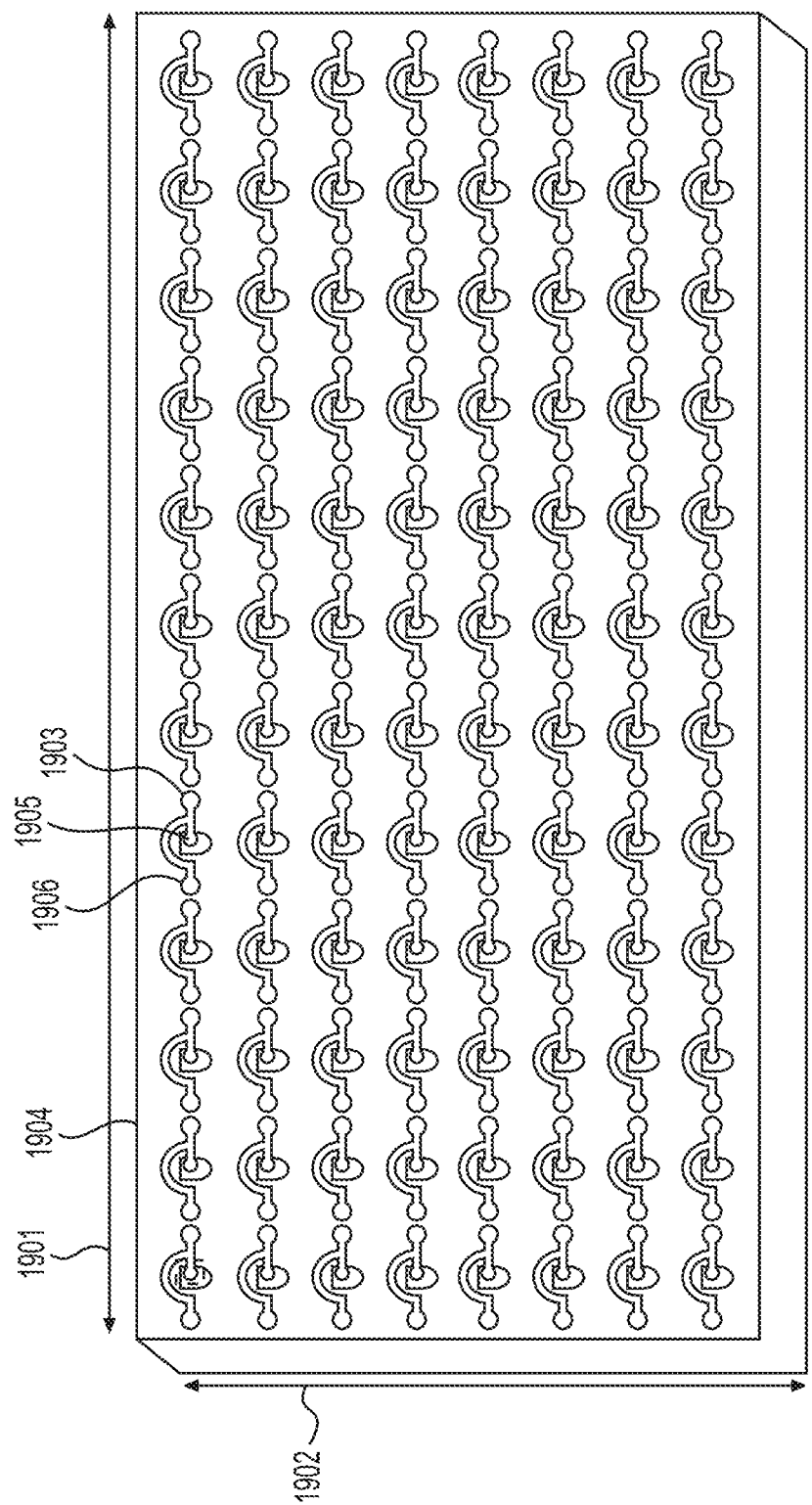
FIG. 19 shows an active lid for the connected traps in an embodiment of manual or electronic pipette driven well plate for nano-liter droplet storage.

With reference now to FIG. 19, shown is an active lid 1905 for the connected traps in an embodiment of manual or electronic pipette driven well plate for nano-liter droplet storage. The lid 1905 contains electrically controlled flaps 1903 that close or open the valves/drilled holes of each fluidic trap. The flaps 1903 may be programmable to be opened/closed for mixing or filling operations. Each flap in the lid 1905 can be independently operated. In the embodiment shown, the lid has a length 1901 of 12.78 cm, a width 1902 of 8.55 cm, electrically operated flaps 1903 that can close or open the hole drilled into the fluidic trap, thereby opening or closing the fluidic circuit, an assembly 1904 to hold and control the flaps 1903, and an USB/electronic interface 7 to control each flap 1903 in the well plate lid 1905. A flap in the open position 1906 is shown.

Figure 20:
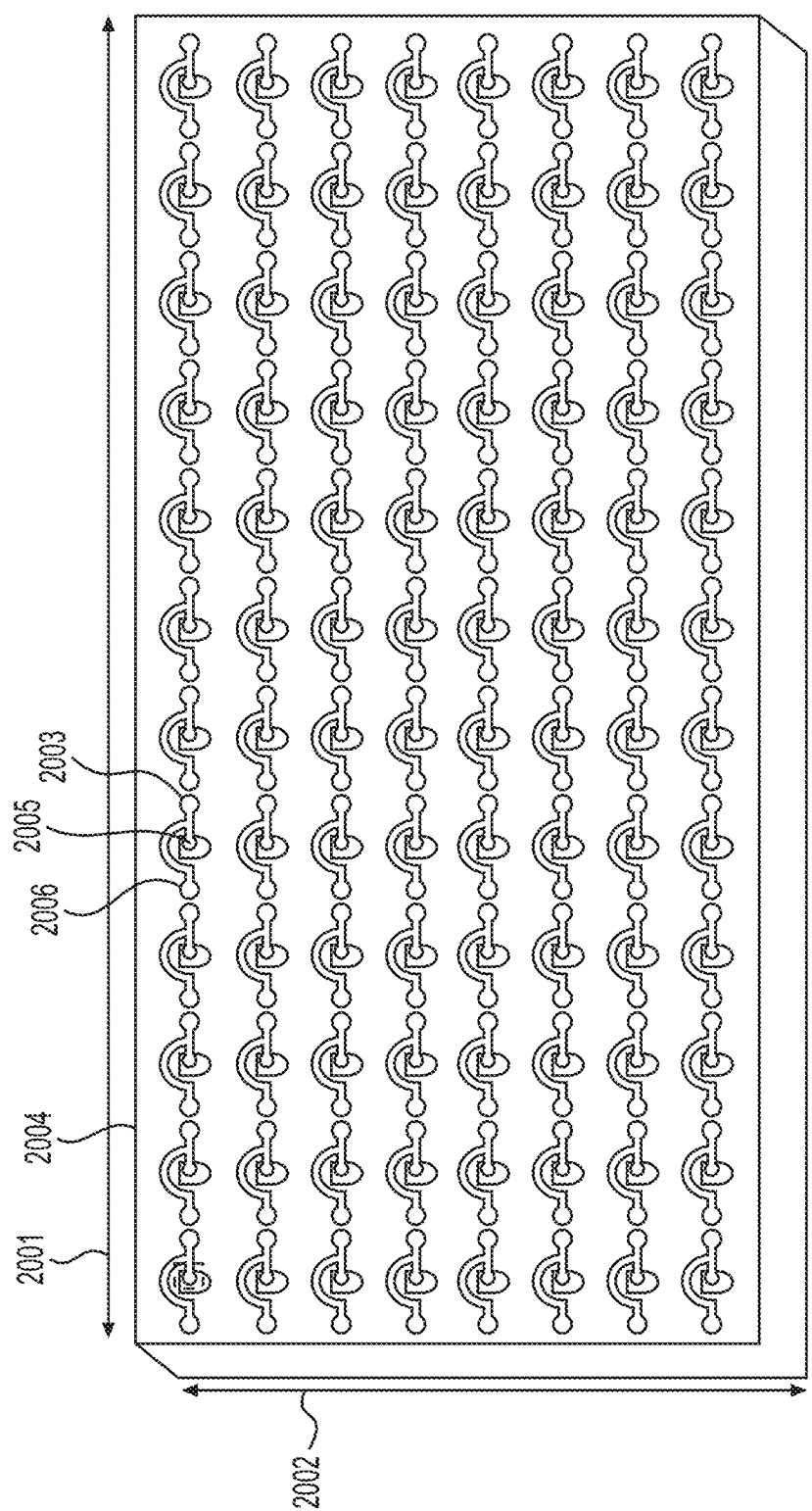
FIG. 20 shows an embodiment of manual or electronic pipette driven well plate for nano-liter droplet storage including an array of individual fluidic traps.

With reference now to FIG. 20, shown is an embodiment of manual or electronic pipette driven well plate 2004 for nano-liter droplet storage including an array of individual fluidic traps. Well-plate 2004 includes an array of 96 fluidic traps (e.g., fluidic trap portions 10 shown in FIGS. 1A-6E), that are not connected to each other, in the format of a well plate. The array of fluidic traps may be injection molded or micro machined in a polymer, such as COC. In the embodiment shown, array/well-plate 2004 has a length 2001 of 12.78 cm, a width 2002 of 8.55 cm, inlet 2003 for reagents/fluid for each individual trap, drilled hole or valve 2005 present in each of the fluidic traps and outlet 2006 for reagents/fluid for each individual trap.

Figure 21:
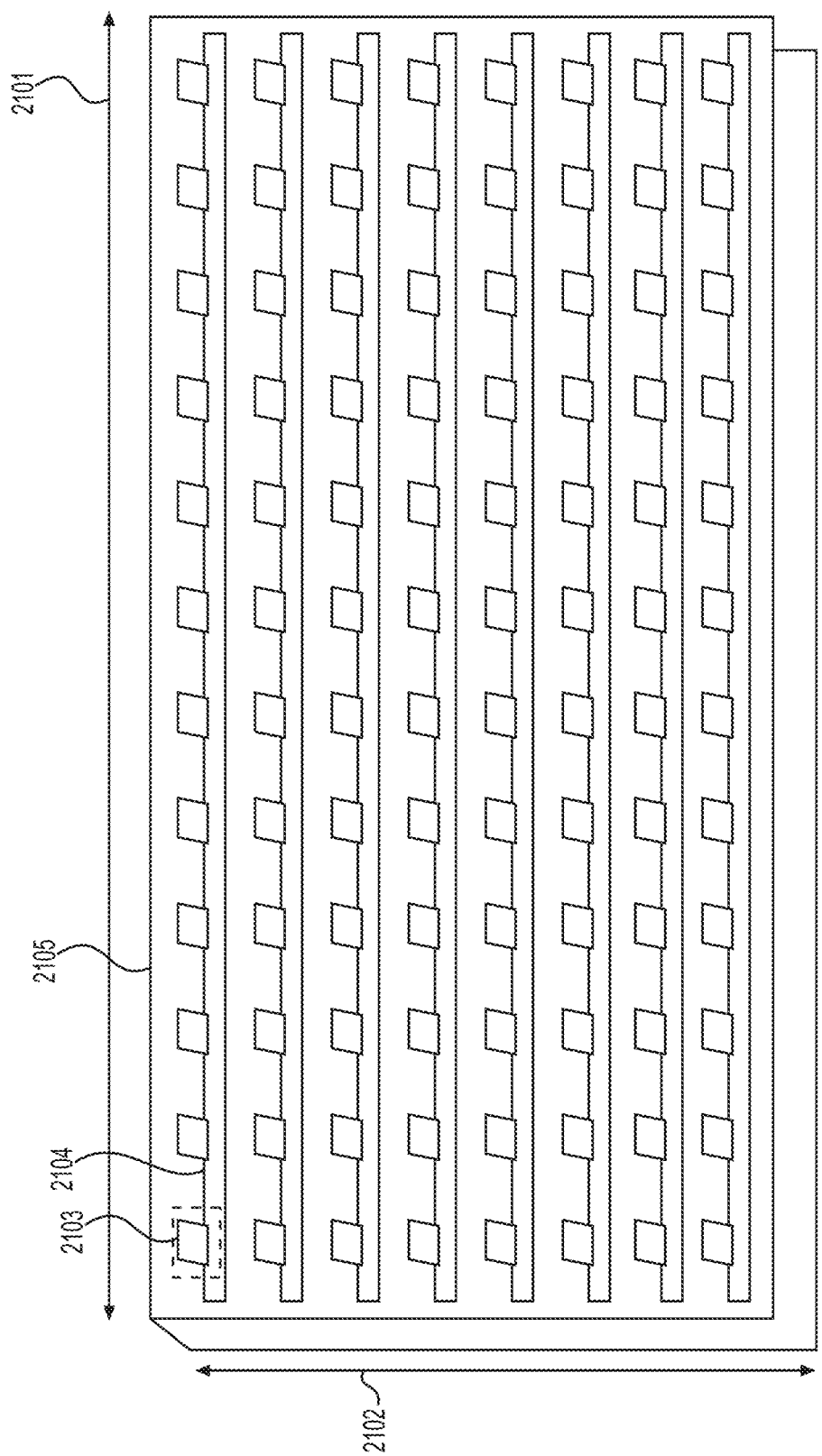
FIG. 21 shows a static lid for the individual traps in an embodiment of manual or electronic pipette driven well plate for nano-liter droplet storage.

With reference now to FIG. 21, shown is a static lid 2105 for the individual traps in an embodiment of manual or electronic pipette driven well plate for nano-liter droplet storage. The static lid contains flaps 2103 that are machined into a polymer, such as COC. The area around the flaps is evacuated to allow access to the inlet and outlet ports of the array in FIG. 9. In the embodiment shown, the lid has a length 2101 of 12.78 cm, a width 2102 of 8.55 cm, flaps 2103 are in closed position at all times and the user places or removes the lid on the well plate array depending on operation on the fluid that is required. For example, for filling operations, the lid 2105 is placed on the well plate array to close the valves/holes of all the individual traps, and for dilution operations, the lid 2105 is removed to allow mixing of reagent B with contents of the trap. The lid 2105 includes an assembly 2104 to hold the flaps.

Figure 22:
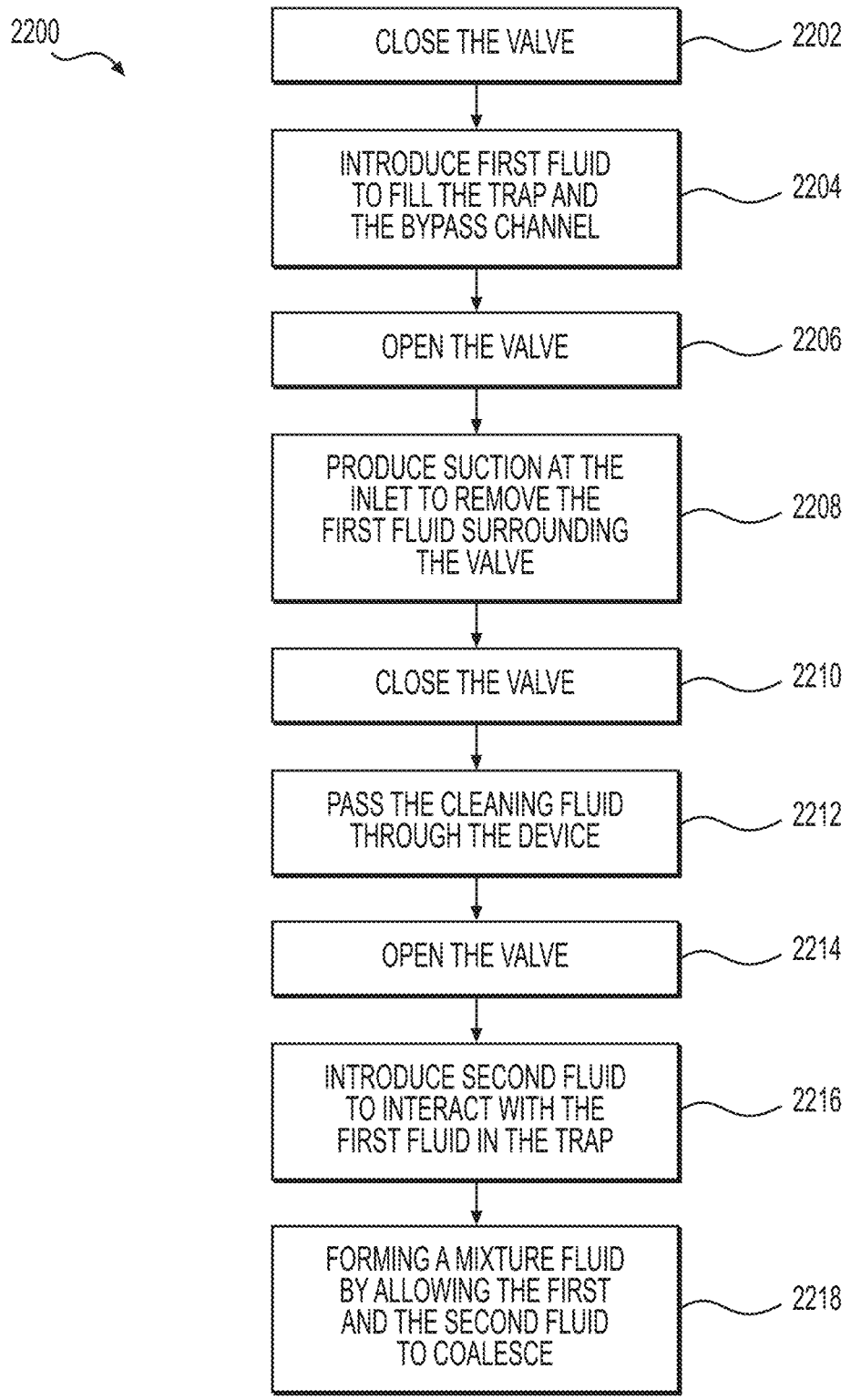
FIG. 22 is a flowchart showing a method of using the manual or electronic pipette driven well plate for nano-liter droplet storage, according to one aspect of this disclosure.

FIG. 22 is a flowchart showing a method 2200 of using the manual or electronic pipette driven well plate for nano-liter droplet storage, according to one aspect of this disclosure. The method 2200 may begin at block 2202. At block 2202, the valve 4 may be closed, for example, by a removable sheet of polymer or by a programmable electronic flap. After block 2202 is completed, the method 2200 may proceed to block 2204.

At block 2204, a first fluid may be introduced into the device at the inlet 1. The first fluid may fill the fluidic trap 3. Any first fluid in excess of what the fluidic trap 3 may hold may fill the bypass channel 7. After block 2204 is completed, the method 2200 may proceed to block 2206.

At block 2206, the valve 4 may be opened, for example, by removing the sheet of polymer or by removing the programmable electronic flap. After block 2206 is completed, the method 2200 may proceed to block 2208.

At block 2208, suction may be produced at the inlet 1 using, for example, a pipette. Producing suction may remove the first fluid surrounding the valve 4. This may result in a crescent-shaped volume of the first fluid in the fluidic trap 3. After block 2208 is completed, the method 2200 may proceed to block 2210.

At block 2210, the valve 4 may be closed, for example, by a removable sheet of polymer or by a programmable electronic flap. After block 2210 is completed, the method 2200 may proceed to block 2212.

At block 2212, a cleaning fluid may be passed through the well plate. The cleaning fluid may remove any leftover first fluid. After block 2212 is completed, the method 2200 may proceed to block 2214.

At block 2214, the valve 4 may be opened, for example, by removing the sheet of polymer or by removing the programmable electronic flap. After block 2214 is completed, the method 2200 may proceed to block 2216.

At block 2216, a second fluid may be introduced into the well plate via inlet 1, for example. The second fluid may then enter the fluidic trap 3. The second fluid and the first fluid may then interact within the fluidic trap 3. After block 2216 is completed, the method 2200 may proceed to block 2218.

At block 2218, a third fluid, which may be a mixture of the first and second fluids within the fluidic trap 3, may be formed. The third fluid may be formed as a result of the first and second fluids coalescing, for example. The method 2200 may then end.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A pipette driven well plate for nano-liter droplet storage, the pipette driven well plate comprising:
    an inlet;
    an outlet;
    a bypass channel connected to the inlet and outlet;
    a fluidic trap connected to the inlet and outlet, wherein fluid enters either an inside of the fluidic trap or the bypass channel, depending on which of the fluidic trap or bypass channel has the lower hydrodynamic resistance; and
    a valve formed on an outer surface of the fluidic trap, wherein the valve comprises a hole formed and defined by the outer surface of the fluidic trap and a removable covering that covers the hole, and the inside of the fluidic trap is opened to atmosphere through the hole when the removable covering is removed, and closed to the atmosphere when the covering is intact.

2. The pipette driven well plate of claim 1, wherein the bypass channel is cleaned by uncovering the hole of the valve by removing the removable covering and introducing a suction at the inlet.

3. The pipette driven well plate of claim 2, wherein a crescent-shaped amount of fluid is formed when the suction is introduced at the inlet, as the fluid portion around the hole is removed.

4. The pipette driven well plate of claim 2, wherein a pipette produces the suction at the inlet.

5. The pipette driven well plate of claim 1, wherein the bypass channel is cleaned by covering the hole of the valve with the removable covering and introducing cleaning fluid at the inlet and the air present between the hole and the inlet prevents cleaning fluid entering the trap.

6. The pipette driven well plate of claim 1, wherein the fluid bypasses the trap due to the air in the portion of the hole and enters the bypass channel when the hole of the valve is covered by the removable covering and hydrodynamic resistance of the bypass channel is less than hydrodynamic resistance of the fluidic trap.

7. The pipette driven well plate of claim 1, further comprising a constriction piping between the fluidic trap and the bypass channel.

8. The pipette driven well plate of claim 1, further comprising an extended channel between the inlet and the fluidic trap.

9. The pipette driven well plate of claim 1, wherein a second fluid is introduced at the inlet when the hole of the valve is uncovered, and wherein the first fluid within the fluidic trap is diluted by the second fluid.

10. The pipette driven well plate of claim 9, wherein the second fluid is removed when suction is introduced at the inlet and a crescent shape is reformed in the trap.

11. The pipette driven well plate of claim 1, wherein the fluidic trap has a side arm and a side arm outlet, wherein when the side arm is closed, the fluidic trap traps fluid and wherein when the side arm is opened, the fluid trapped within the fluidic trap is extracted via the side arm outlet.

12. The pipette driven well plate of claim 1, wherein the removable covering is a programmable electronic flap.

13. The pipette driven well plate of claim 1, wherein the removable covering is a sheet of polymer.

14. A method for using a pipette driven well plate for nano-liter droplet storage, the method comprising:
    closing a hole of a valve formed and defined by an outer surface of a fluidic trap, wherein the hole is formed on the outer surface of the fluidic trap, the inside of the fluidic trap is opened to atmosphere through the hole of the valve when the hole of the valve is opened;
    introducing a first fluid to fill an inside of the fluidic trap and partially fill a bypass channel;
    opening the hole of the valve;
    removing the first fluid surrounding the valve; and
    introducing a second fluid into the fluidic trap,
    wherein the introducing results in a mixture of the first and second fluids.

15. The method of claim 14, wherein the removing step further comprises:
    providing a suction force at an inlet of the well plate.

16. The method of claim 14, further comprising:
    closing the hole of the valve; and
    passing cleaning fluid through the well plate to clean the bypass channel.

17. The method of claim 14, wherein the hole of the valve is opened by removing a sheet of polymer or programmable electronic flap, and wherein the hole of the valve is closed by providing the sheet of polymer or the programmable electronic flap.

19. The method of claim 14, wherein said introducing the first fluid is performed while the hole of the valve is closed.

19. The method of claim 14, wherein said removing the first fluid surrounding the valve is performed while the hole of the valve is opened.

\* \* \* \* \*